(12) United States Patent
Kavipurapu

(10) Patent No.: US 7,236,488 B1
(45) Date of Patent: Jun. 26, 2007

(54) INTELLIGENT ROUTING SWITCHING SYSTEM

(76) Inventor: Gautam Kavipurapu, 7750 North MacArthur, Irving, TX (US) 75063

( * ) Notice: Subject to any disclaimer, the term of this patent is extended or adjusted under 35 U.S.C. 154(b) by 1065 days.

(21) Appl. No.: 10/216,267

(22) Filed: Aug. 9, 2002

Related U.S. Application Data

(60) Provisional application No. 60/311,573, filed on Aug. 10, 2001.

(51) Int. Cl.
*H04L 12/50* (2006.01)
*H04Q 11/00* (2006.01)

(52) U.S. Cl. ..................................... 370/388

(58) Field of Classification Search ............. 370/352, 370/386–400, 353, 448, 458, 442, 252, 360, 370/413, 432, 351; 455/296, 63.1; 379/114.15, 379/90.01, 93.07, 156, 198; 348/14.09, 14.12, 348/14.13, 14.08; 375/348, 350, 346, 229; 709/239, 222

See application file for complete search history.

(56) References Cited

U.S. PATENT DOCUMENTS

| | | | |
|---|---|---|---|
| 7,006,505 B1* | 2/2006 | Bleszynski et al. | .... 370/395.72 |
| 2002/0064149 A1* | 5/2002 | Elliott et al. | ................. 370/352 |
| 2005/0186933 A1* | 8/2005 | Trans | ......................... 455/296 |

* cited by examiner

*Primary Examiner*—Chi Pham
*Assistant Examiner*—Prenell Jones
(74) *Attorney, Agent, or Firm*—Thompson & Knight, LLP; James J. Murphy

(57) ABSTRACT

An intelligent routing and switching system includes an interface for coupling said system to an external network and a switch fabric for selectively routing bits of data being exchanged with an external network through the interface. The switch fabric includes an array of multiport switching elements each including switches and memory elements for introducing programmable delays in selected ones of the bits being routed. The routing and switching system further includes a first controller for implementing a routing table and scheduler in accordance with a sequencing graph to route bits of data through the switch fabric and a second controller for generating the sequencing graph and for allocating input and output slots for inputting and outputting data through the interface.

1 Claim, 13 Drawing Sheets

| | SOURCE IP ADDRESS | DESTINATION IP ADDRESS | INPUT PHYSICAL PORT | OUTPUT PHYSICAL PORT | LABEL | STATUS |
|---|---|---|---|---|---|---|
| READY TO BE SCHEDULED | 102.101.113 | 110.101.123 | SNL 1.P.1 | SNL 6.P.10 | 5 | 0(READY) |
| | 105.103.040 | 030.119.103 | SNL 3.P.4 | SNL 4.P.1 | 3 | 0(READY) |
| SCHEDULED → | 112.111.002 | 112.111.200 | SNL 2.P.2 | SNL 2.P.3 | 7 | 1(DONE) |
| | | | | | | |
| | | | | | | |
| | | | | | | |

INTELLIGENT ROUTING SWITCHING SYSTEM

CROSS REFERENCE TO RELATED APPLICATIONS

This utility application for patent is being filed from Provisional Patent Application Ser. No. 60/311,573, filed Aug. 10, 2001, entitled "Intelligent Routing Switching System" by inventor Gautam Karipurapu and related to the following applications for patent:

Pending U.S. patent application Ser. No. 09/707,606, filed Nov. 7, 2000, by inventor Kavipurapu, entitled "High Speed, Scalable, Dynamic Integrated Programmable Switch (Dips) Device", currently pending;

Pending U.S. patent application Ser. No. 09/729,531, filed Dec. 4, 2000 by inventor Kavipurapu, entitled "Dynamically Programmable Integrated Switching Device Using An Asymmetric 5T IC Cell", currently pending; and Pending U.S. patent application Ser. No. 09/761,068, filed Jan. 16, 2001 by inventor Kavipurapu, entitled "Highly Efficient Design of Storage Array for Use in Caches and Memory Subsystems", currently pending

FIELD OF THE INVENTION

The present invention relates in general to information transmission networks and in particular to an intelligent routing switching system.

DESCRIPTION OF THE RELATED ART

In microprocessor based systems, tasks are typically defined in a high level set of instructions written in a suitable high level programming language. The operating system then controls the breakdown of the high level instructions into lower level instructions ("native code" or "byte code") which are executed by the microprocessor. The operating system also arbitrates in case of contention for the various resources of the system.

The operating system normally converts high level instructions into lower level instructions executable by the microprocessor using a compiler. Compilers are well known in the art; the basic components of which are illustrated in FIG. 1. These components can be partitioned into hardware and software, depending on the given design. Typically, in systems requiring static code generation, all compiler components are implemented in software, while in systems requiring dynamic code generation, some of the compiler components may be implemented in hardware. It should be recognized that implementing components of the compiler in hardware reduces system flexibility and the re-programmability of the machine using a high level language.

One of the components of the compiler is the scheduler which schedules, at compile time, the tasks called for in the code for execution by the target hardware. Scheduling also includes implementing memory management functions such as controlling the use of global registers, and the utilization of different levels in memory hierarchy. Typically, tasks are scheduled through the ordering of instructions in a sequence and the insertion of memory references. Normally, scheduling is static, such that once the ordering of instructions is set at compile time in cannot be changed.

Another important function of the schedulers is binding. Binding is generally the process of optimizing code execution by associating different properties to a sequence of instructions. For example, in resource binding, a sequence of operations are mapped to the resources required for their execution. If several instructions map to the same hardware for execution, the scheduler, under the resource binding protocol, distributes the execution of the set of instructions by resources based on a given set of constraints to optimize performance.

Generally most of the scheduling problems are modeled as ILP (Integer Linear Programming) problems, where the schedule of the required sequence of instructions is decided based on a set of simultaneous linear equations.

SUMMARY OF THE INVENTION

According to the principles of the present invention, general-purpose scheduler for executing a task that contains a set of instructions that are distributed to several execution units is described. These units can be of the same type or of dissimilar type. The units may also have the property where they are designed to execute only one kind of instruction that is a subset of the set of instructions for the entire task or can execute multiple instructions a set of which forms subset of set of instructions of the entire task.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–14 of the drawings, in which like numbers designate like parts.

DESCRIPTION OF THE PREFERRED EMBODIMENTS

The principles of the present invention and their advantages are best understood by referring to the illustrated embodiment depicted in FIGS. 1–14 of the drawings, in which like numbers designate like parts.

The purpose of this document is to define a standard architecture for the functional blocks that are part of the IRIS platform. IRIS stands for Integrated Routing and Intelligent Switching, and is the flagship architecture of IRIS technologies switch/router product line. The IRIS switch router delivers terabits of throughput in a single chassis.

The IRIS platforms are designed to be cost-effective and scalable to deliver hundreds of terabits of throughput in a single chassis. This is done using several proprietary and patent pending technologies.

This document is to be used as an introduction to the IRIS architecture as well as an accompaniment to the specification documents for IRIS Edge 2002 and IRIS Core 2003.

High Level Functional Block Diagram

Figure 1:
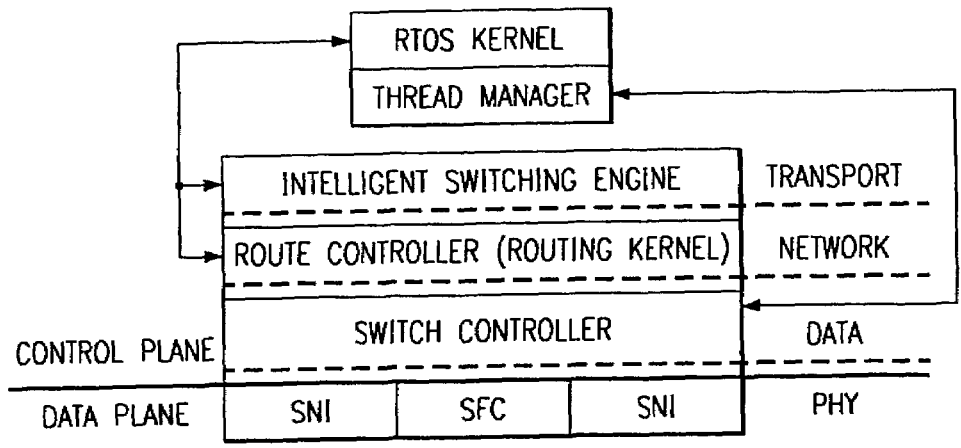
FIG. 1 shows the system elements of any IRIS switch/router.
Figure 2:
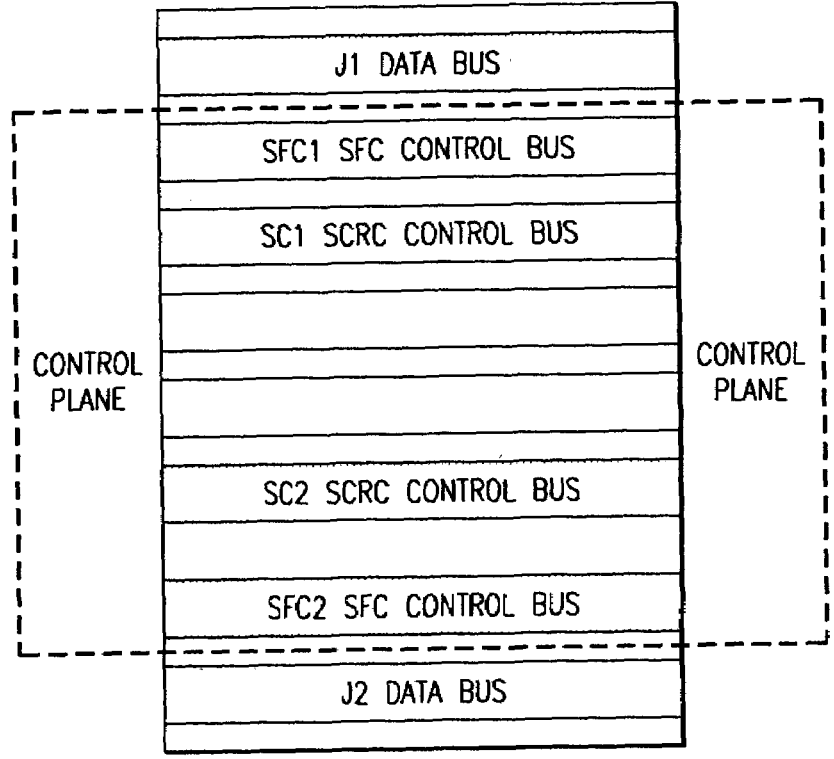
FIG. 2 illustrates when all the cards plugged into a chassis that is shown in FIG. 2 through the connectors at the back of each card.

The FIG. 1 below shows the system elements of any IRIS switch/router. This is compared to the OSI 7 layer stack (on the right). It must be noted that the OSI 7 layer stack indicates the functionality of each of the layers. The IRIS system architecture indicates the hierarchical of each of the system elements that are a combination of hardware and software. The control plane elements implement all the control functions of the switch and are a combination of hardware software and firmware. The elements in the data plane are mostly hardware elements that deal with structured/unstructured bit streams.

Functional description of each block as well as its architecture is defined in the following sections.

The separate functional units or cards that are a combination of hardware, software and firmware are:
SNI: Standard Network Interface Card
SFC: Switch Fabric Card
SCRPC: Switch Controller and Route Processor Card
SCC: System Controller Card All these cards plug into a chassis that is shown below in FIG. 2 through the connectors at the back of each card. The back-plane is an optical back-plane that implements a packet protocol for the cards to communicate within the chassis and with each other and is described in detail in the patent titled "A Packet Protocol for Data and Control"

Figure 3:
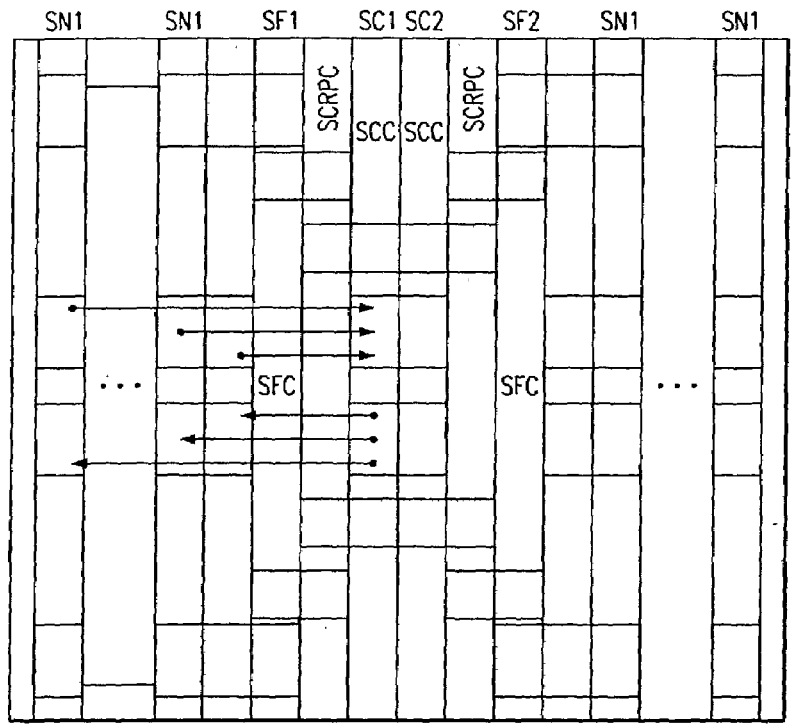
FIG. 3 illustrates the interconnection of each of the cards that plug into the backplane being accomplished in a star fashion while all the transmit ports of each SNI card are connected to the receive port of the SFC and the transmit port of the SFC is connected to all the receive ports of each of the SNI cards.

The interconnection of each of these cards that plug into the backplane is accomplished in a star fashion. All the transmit ports of each SNI card are connected to the receive port of the SFC and the transmit port of the SFC is connected to all the receive ports of each of the SNI cards. This is shown in FIG. 3. The access to the central switch and the switch fabric itself is allotted in a TDM manner to each of the Individual SNI and the ports within the SNI. The interconnection in the backplane is shown in FIG. 3 below

Standard Network Interface (SNI)

These are essentially PIC cards (Physical Interface Cards) or network interfaces that connect an IRIS switch/router to the external world. In IRIS routers like the IRIS Edge 2002 or IRIS Core 2003 these standard network interfaces are PIC cards that fit into a chassis. A PIC card includes the physical ports plus the physical (PHY) layer circuitry (MAC or Media Access Controller, SERDES or Serialization and De-Serialization etc).

Figure 4:
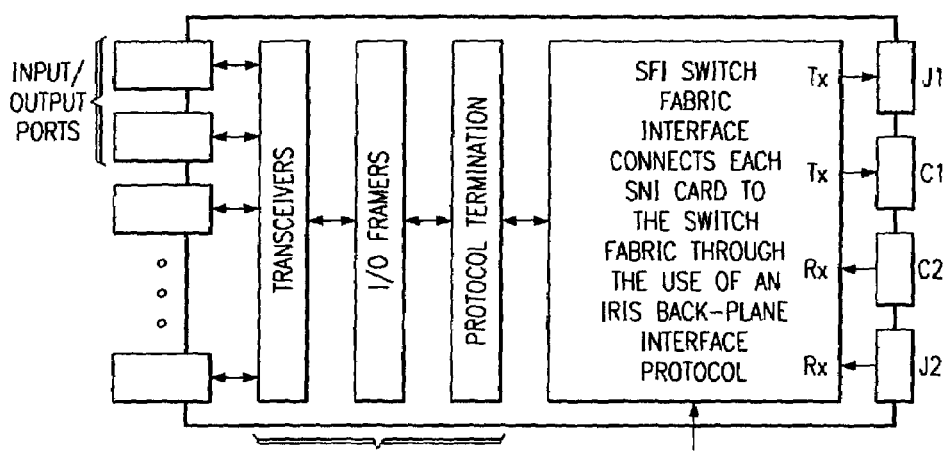
FIG. 4 illustrates the architecture of an IRIS standard network interface.

The architecture of an IRIS standard network interface is shown in FIG. 4.

The front end to the IRIS SNI card is the PHY layer interface and transceivers that connect to the physical port. The transceiver block can be made from a single IC or multiple IC based on the number of physical ports on the SNI card and the port density supported on the commercially available transceiver IC. The transceiver block also contains the SERDES block. The framer functionality might be part of the transceiver IC based on the type of interface the SNI card supports. The next block is the protocol termination block includes all the MAC and Protocol termination functions such as the ATM SAR functionality. This again is based on the type of network the SNI card connects to and protocol being used at each layer of the network. The SNI card will usually terminate the PHY layer and the Data layer protocols. The last block is an ASIC that implements the IRIS inter-connect protocol to connect the SNI to the IRIS Switch Fabric Card or the SFC. The functionality of this ASIC is explained in the next section.

SNI-SFI ASIC

SNI-SFI (Standard Network Interface-Switch Fabric Interface) ASIC has several functions. These functions can be summed up as connecting the SNI to the rest of the IRIS system through the connectors at the back of the SNI. These connectors are: J1 and J2 that are used to transmit the data to and from SNI to the SFC. There are two control connectors labeled C1 and C2 that are used to connect the SNI to the System Controller Card (SCC).

J1 Transmit Data Bus

J2 Receive Data Bus

C1 Transmit Control Bus

C2 Receive Control Bus

J1, J2, C1 and C2 can be either electrical or optical. It is better to design the system for evolution, thus optical interfaces are the ideal choices. Thus in the actual implementation of the J1 and J2 connectors and the C1 and C2 interfaces there will be an optical transceiver that interfaces with the SNI-SFI ASIC.

Figure 5:
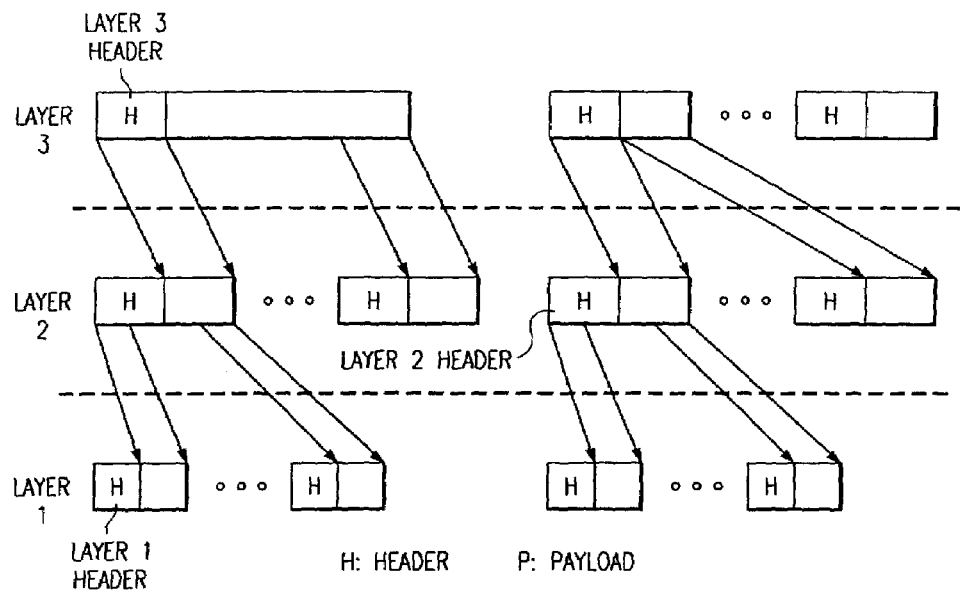
FIG. 5 illustrates the packet at layer I will contain subset of the layer 2 packet that are fragments of the layer 2 header or the payload.

Data comes in serially through each of the physical interface ports on the SNI card. This data is put into registers and is queued so that it can be passed up to the system controller to be processed. In a serial stream the first few bits will always contain the header. Since the header is encapsulated into the lower layer packets the lower layer packets contain the header of that particular layer. This process is shown in FIG. 5. The higher layer header needs to be extracted and passed on to the ISE (Intelligent Switching Engine) running on the SCC (System Controller Card).

The encapsulation process involves taking the packet at the higher layer and converting it into the packets at the lower layer. There are several references available on how to do this and a common technique being employed is called tunneling. In tunneling the controller at the lower layer looks at the higher layer header and router the lower layer packets. This can be implemented in the software portion of the system controller and is beyond the scope of this document.

As is shown in FIG. 5, the packet at layer I will contain subset of the layer 2 packet that are fragments of the layer 2 header or the payload. The boundaries of the frames or packets will be designated usually by a framing convention used in the PHY layer protocol. Usually in most protocols there is a frame bit that is transmitted with each new frame. After the header is received by the SNI-SFI ASIC, it is passed on through the control connector C1 to the route lookup engine that is part of the SCC (System Controller Card). The data bits associated with the header of the incoming packet are stored in a common global register that is accessible to the route lookup engine that runs on the SCC. This route lookup engine and the scheduler are part of the Intelligent Switching Engine or ISE software that is unique to IRIS platforms.

This is done in response to the read enable and other control information received from the SCC through connector C2. This operation is controlled by the ISE running on the SCC. The ISE uses a dynamic TDM scheduler to assign read and write windows to each of the SNI cards and the ports within the SNI card. The time slot assignment to each SNI card for a sequence of system clock cycles is static. It will change however in what is called a duty cycle. The duty cycle is the time it takes to service all the ports in a particular IRIS switch router for a given system clock operation speed (100 Mhz). This duty cycle normalizes the random data flows into the IRIS box from the external inputs.

There is a dynamic mode that can be set in the ISE that will change the time slot assignments to each of the ports based on the type of flows being input to the system. This is covered in the patent, "Composite Dataflow Modeling Function." This allows the ISE to track the random inputs to the switch and create a composite model for the traffic coming in. This function can be implemented in a co-processor DSP on the SCC, in software as part of the ISE or in hardware as part of the route processor ASIC. If this function is implemented in hardware as part of the route processor ASIC then this will generate the label assignments to each of the flows dynamically every clock cycle. This will be explained in detail in the SCRPC (Switch Controller Route Processor) section and the SCC (System Controller Card) sections.

Figure 6:
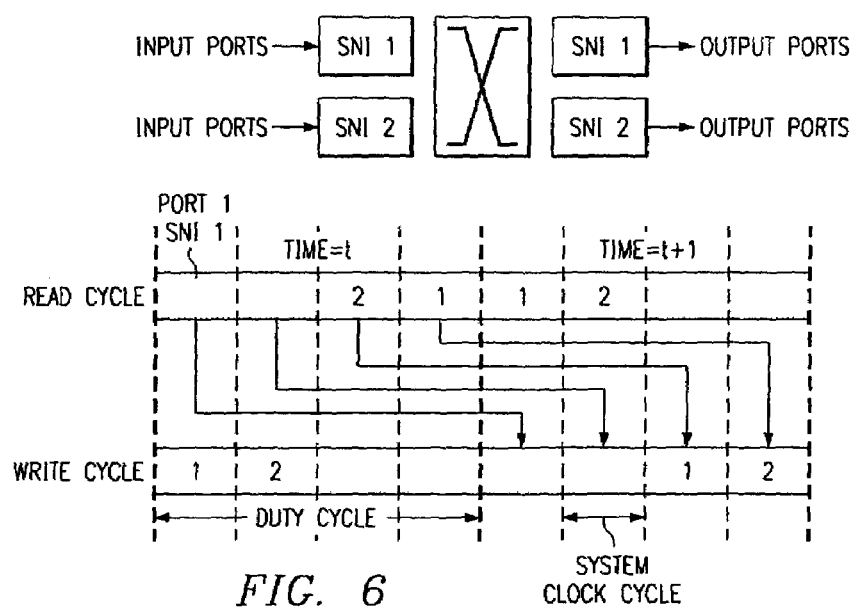
FIG. 6 illustrates the time slot assignments as controlled by the SCC on the ISE.
Figure 7:
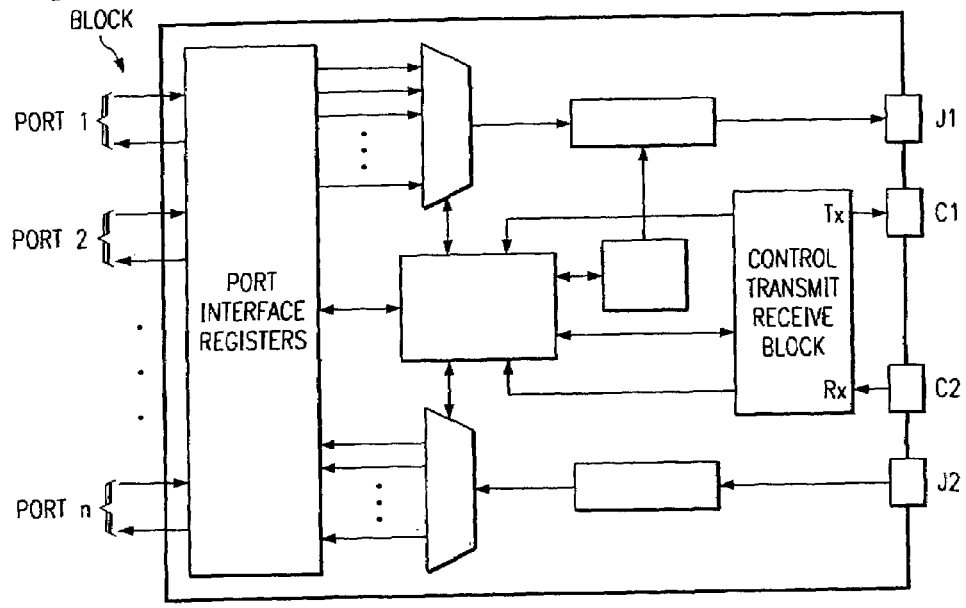
FIG. 7 illustrates the internal architecture of the SNI-SFI ASIC.
Figure 8:
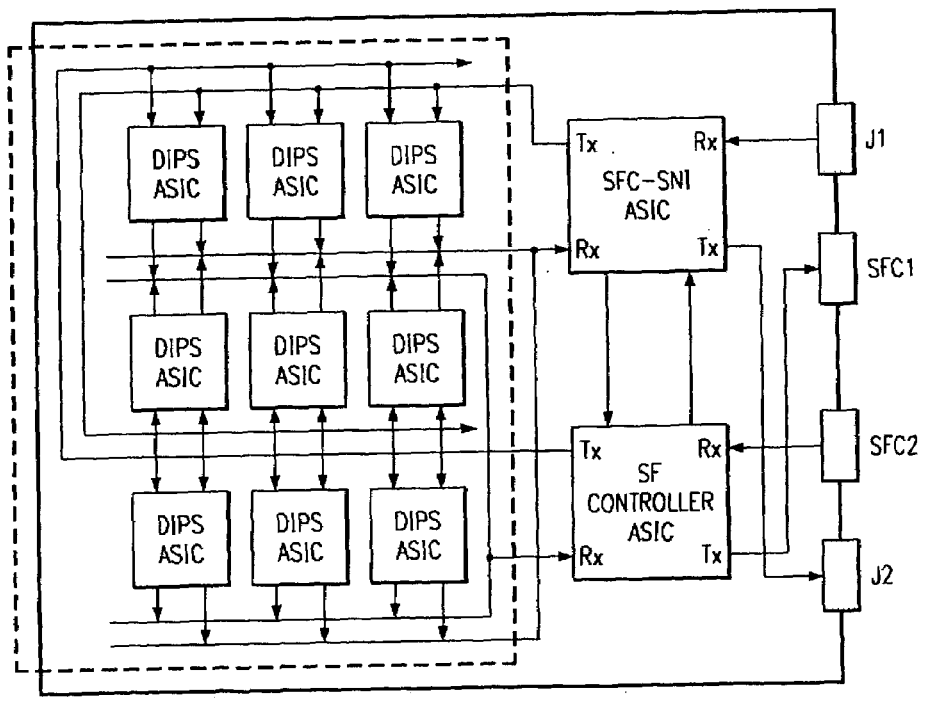
FIG. 8 illustrates the architecture and the general block diagram of the IRIS SFC or the Switch Fabric Card.

The time slot assignments as controlled by the ISE on the SCC are shown in FIG. 6. Thus each SNI card is assigned a read slot and a write slot. During the read cycle data is read from each individual port on the card. This data can be a header or actual payload of the packet. This function is explained in the patents titled: "Scalable Scheduler Controller for a switch Fabric," "Constraint Driven Routing Algorithm."

Data from each port is written into global registers that are visible to higher layer control blocks in the IRIS system, in particular the SCC. These registers emulate input queues for each of these physical ports. The width of each of these registers is determined by the width of switch fabric input ports. As will be explained in the SFC (Switch Fabric Card) section, the port width of the SFC is scalable linearly. Thus the smallest port width possible is the port width of each DIPS ASIC device. For a description of the DIPS device refer to patent titled "A Dynamic Integrated Programmable Switching (DIPS) Device"

Figure 10:
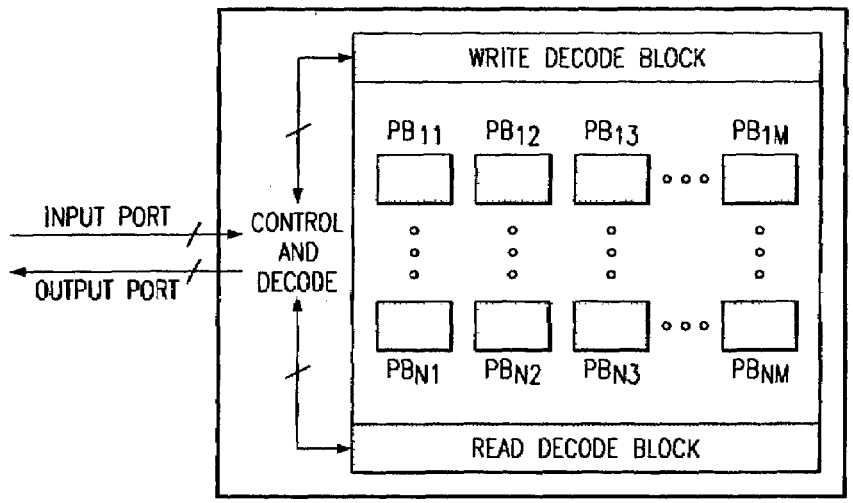
FIG. 10 is a block diagram of a switch device.

Each DIPS device, as shown in FIG. 10, has one input port and one output port of width=64 bits. Since the input port of the switch fabric is formed by linearly placing several of these DIPS devices in a row the maximum width of the input port is 64x# of DIPS in a row in the SFC. As an example let's assume that the fabric has 4 DIPS devices in a row that means an input port width of 256 bits and an output port width of 256 bits. The method that the designer should use to size these registers is, the slowest port on the SNI-SFI is assigned input and output registers that are 64 bits wide. The parameter that sets the limit on how many lower speed links can be serviced is the design of the fabric and size of the registers that are assigned to the higher speed ports. In the above example if a port that is 256 bits is assigned to an OC-48 port then it takes the OC-48 port about 103 ns to fill the register. This is because the data on the OC-48 port is coming in serially at the rate of 2.5 Gbps.

If the Switch Fabric and the system is running at 100 Mhz then a switch that is 256 bits wide can service 10 OC-48 physical ports each clock cycle=(256/(2.5 Gbps))*(100 Mhz). Let's assume on the trunk interface only two OC-48s are required. The router used as an edge router. That means there are 8 OC-48 slots open. These slots can be used to service multiple 100 BT where the links are running at 100 Mbps. The total number of 100 BT that can be serviced is =200=(8×2.5 Gbps)/(100 Mbps).

This configuration forms a true wire-speed router that can symmetrically switch any input data on 200 100BT ports and 2 OC-48 ports to output on 200 100BT ports and 2 OC-48 ports. Adding QoS based time slot queuing and de-queuing priorities allows one to either increase the density of ports or increase the throughput.

For a larger system or one with higher density, only the SFC card needs to be replaced together with the SNI cards, the SCC card does not need to be replaced. This allows the service provider or the end user of the IRIS system to mix and match interface cards according to their evolving network and the demands in that network. The internal architecture of the SNI-SFI ASIC is shown below in FIG. 7.

For a wider switch for example that has port that is 4096 bits wide, one can symmetrically switch at wirespeed about (4096/(10 Gbps))*(100 Mhz)=40 OC-192 ports on the input and 40 OC-192 ports on the output in a single chassis. This same combination of SCC and SFC can be used to switch about (4096/(2.5 Gbps))*(100 Mhz)=160 OC-48 on the input and 160 OC-48 on the output symmetrically at wirespeed. This configuration of the IRIS router can also do a packet by packet routing of the data on each of the ports.

Another key function of the SNI-SFI ASIC is to tag each of registers with a header when they are sent into the switch matrix on the SFC. This header allows the SNI-SFI to create IRIS packets that are used to carry payload between the SNI and the SFC. The header is used to keep track of packets associated with the same flow as well as the sequence of packets in the flow. The IRIS data Packets and the protocol used to communicate is described in detail in the patent titled: "A Packet Protocol for Data and Control."

Switch Fabric (SFC)

The IRIS switch fabric is designed using IRIS switch devices that have a special architecture that combines both switching elements and memory. The memory element coupled with the switch allows one to introduce programmable delays in routing each of the individual data bits through the fabric.

The combination of the memory and the switching element into one also eliminates the need for large buffers in the input and output stages of the fabric. The IRIS switch ports are in a ASIC that is called a DIPS. Each DIPS has several input ports available organized as port-blocks. Each of these port blocks have a width of 64 bits or more, into which data is stored. These port blocks are arranged in matrix array with a programmable decode.

The switch fabric itself consists of an array of these DIPS arranged in rows and columns to form the switch fabric. The architecture and the general block diagram of the IRIS SFC or the Switch Fabric Card is shown below in FIG. 8.

Figure 9:
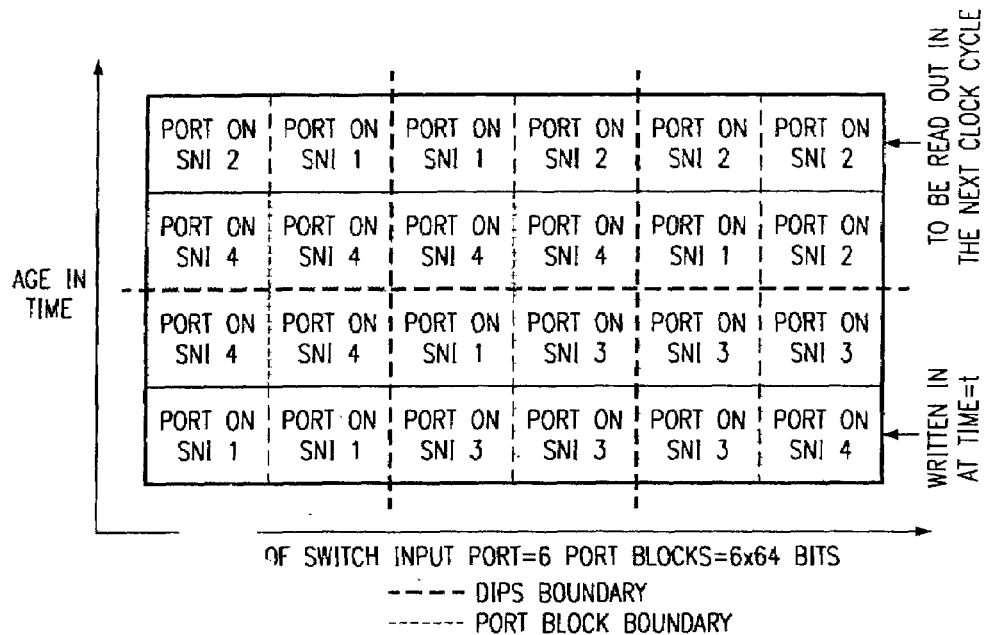
FIG. 9 illustrates the condition when, based on the number of registers or ports that need to be read in a given time slot and the sizes of those the data in the switch matrix looks like a stack of Tetris blocks.

The SFC card has three major components listed below:
The Switch Matrix made up of DIPS devices
The SFC-SNI interface ASIC
The SF Controller ASIC The switch matrix is composed of multiple DIPS devices arranged into rows and columns. This arrangement of the DIPS devices in rows and columns creates a Switch that has an input port that has a width=64 bits×# of DIPS in a row and an output port of the same width. The additional DIPS devices are arranged in columns to allow the non-blocking operation of the switch. Since data is written in 64 bits at a time or multiples thereof and each device has an input port that is 64 bits wide, the following applies:

To write an IRIS data packet that is 64 bits wide, one can write into single DIPS device and address a single Port-block within the device at any given time. To write a packet that is multiple of 64 bits, several DIPS devices need to be used. This implies that based on the number of registers that need to be read in a given time slot and the sizes of those the data in the switch matrix looks like a stack of Tetris blocks. This is shown in FIG. 9

Thus data is written into this switch matrix that implements a Shift Function or a FIFO using these discrete devices. It will be obvious to a person who is familiar with route lookups and the process of routing that essentially a route lookup involves repeated shifts and functions on a given bit-string or a data-word. A combination of the SFC, the SCC and the SCRPC implements a large distributed network processor that is dynamically reconfigurable. A block diagram of the switch device is shown in FIG. 10.

The data is thus written into any Port-Block within the DIPS device by asserting the proper read and write control signals and also by placing the appropriate data word (in this case a packet) on the input port. It must be noted that Data can be read out asynchronously from this device while the write operation is taking place. The steps to read data from a Port-Block, other than the one to which data is being written to, the appropriate read signals need to be asserted.

The operation of the DIPS device is outlined in the patents listed below
Switching Device (Device Architecture) "DIPS"
5T-IC embodiment of switching device
2T-IC embodiment of switching device
1T-IC embodiment of switching device
Asymmetric SRAM embodiment of switching device
Symmetric SRAM embodiment of switching device The SFC-SNI interface ASIC takes the 64 bit packet that is generated by the SNI-SFC interface ASIC on the SNI cards and pre-writes it. That means that it is stored in a register that is one entry deep and 64 bits wide, or a multiple of 64 bits wide. This ASIC also pre-reads the output from the individual devices. Width of these registers is equal to 64x# of DIPS in a single row in the SFC. This allows the IRIS SFC to operate asynchronously and decouple itself from the data rates of the SNI physical ports.

The SFC-SNI interface ASIC is connected to the following connectors:
J1: Receive Data Bus
J2: Transmit Data Bus Again going back to the visualization of the SFC, SCRPC and the SCC together implementing a Large distributed network processor, this allows one to implement a network processor at the Macro level that has a pipeline with the depth that is equal to the number of Port Blocks in the SFC distributed within the various DIPS devices. Thus the switch matrix remains non-blocking as long as this pipeline depth is not exceeded by the distinct input data flows that need to be routed in a given duty cycle (That can be multiple system clock cycles). As explained before the duty cycle is measured as the time interval between the first time a particular physical port on an SNI card is served and when it is served again.

The SF controller ASIC is connected two control connectors that are:
SFCI: Transmit Control Bus for SFC
SFC2: Receive Control Bus for the SFC The SFC1 and SFC2 connect the SFC to the SCRPC (Switch Controller and Route Processor Card). The SFC Controller ASIC asserts the appropriate read and write signals to the appropriate DIPS device or Devices.

The interconnect or the decode of the control inputs received from the SCRPC and in particular the assertion of the read and write signals on every duty cycle in the switch matrix is controlled by the SF Controller ASIC. The SF controller ASIC implements some of the decodes and methodologies outlined in the following patents:
2D switch fabric
3 D switch fabric
Butterfly switch fabric An example of this is when a multicast session is to be sustained for a particular flow. The routing problem can be reduced to scheduling all the data from a particular IP address to multiple output IP addresses. Reducing this problem to a graph, the problem can be visualized as traversing a graph whose edges connect a point at the center of the sphere to multiple points on the surface of the sphere. If QoS labels are used to calculate the distances of these points from the center, that means, this can be physically mapped to addresses of a portblocks within the 3-D switch matrix being implemented by the multiple DIPS ASIC.

Since all the flows associated with that multicast will have the same QoS and routing constraints, the scheduling problem reduces to traversing the graph whose points from a sphere. This in effect can be translated to storing the same input payload associated with a particular input port and IP address combination into several portblocks that have the same logical address offset and are in turn mapped to all the necessary output IP addresses.

Switch Controller Route Processor (SCRPC)

Figures 11, 12:
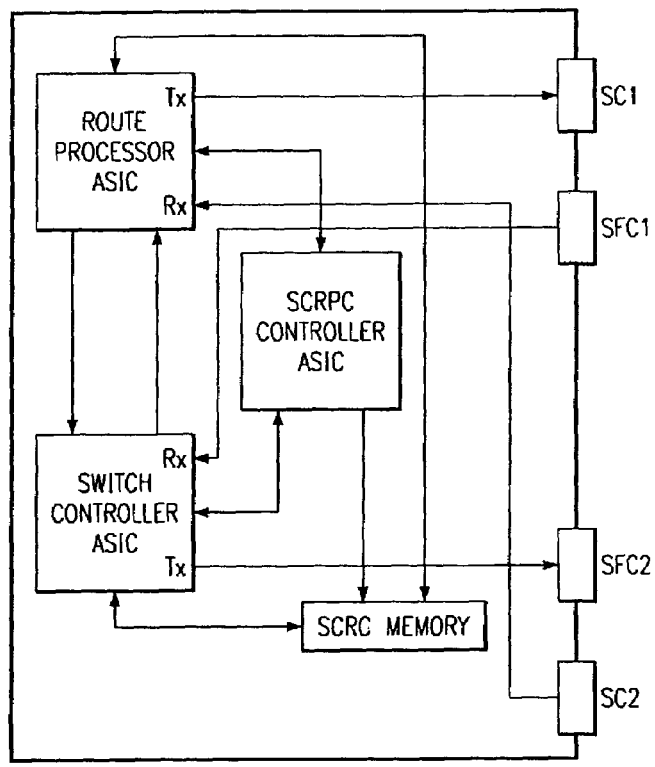
FIG. 11 is a block diagram of the SCRPC card.
FIG. 12 is a diagram illustrating Route Lookup Scoreboard using the Route Processor (RP)

This card is the next level up in the system hierarchy. The SCRPC card is shown in FIG. 11. The basic function of the elements on the SCRPC is explained in this section. The SCRPC contains the following elements:

Route Processor (RP) ASIC
Switch Controller (SC) ASIC
SCRPC Controller ASIC
SCRPC Memory Each of the individual elements closely interacts with the system controller card to provide a flexible scalable switch router that fully takes advantage of the linear scalability of the IRIS DIPS device and the switch fabric formed from the DIPS ASIC.

The SCRPC is connected to the rest of the system through four ports available on the back of the card these are:

SC1: Transmit Control Bus from the SCRPC to the SCC
SC2: Receive Control Bus from the SCC to the SCRPC
SFC1: Receive Control Bus from the SFC to the SCRPC
SFC2: Transmit Control bus form the SCRPC to the SFC The function and the use of each of the above busses is explained in the following few paragraphs. The SCRPC implements the firmware portion of the ISE i.e. the route lookup and also the hardware scheduler/controller for the switch fabric that is on the SFC. The reason why this function has been separated from the SFC is, because these functions belong in the control plane, and form the re-configurable and scalable part of the switch. This allows the upgrades to be done in a more modular fashion and more cost effectively.

The SC1 and the SC2 busses are used to exchange information between the SCRPC and the SCC (System Controller Card). SC1 is used to transmit information up to the SCC. This information is transmitted in a format compatible with the IRIS data and control packet protocol. The main function of the RP ASIC is to communicate to the higher level in the IRIS system hierarchy using these ports.

The Route Processor ASIC (RP) generates fast hardware route lookups and keeps updating the lookup table that is stored in the SCRPC memory that is usually made up of SRAM. The entries in the lookup table correspond to the number of ports on the IRIS switch router. This limits the size of lookup table to be stored in hardware compared to CAM based systems which loose scalability because of their ability to store large lookup tables. This is illustrated in FIG. 12 below.

Thus the headers from the SNI are flowed up to the SCC which in return generates a request for the RP ASIC to perform a fast hardware lookup on the requested address and flow it back to the SCC to fill in the Scheduler with the labels. To maintain the coherency the RP ASIC does not perform any scheduling functions except for the route lookups. The IP address lookup table is maintained in the memory on the SCRPC when the switch is provisioned. For software lookups, one can disable this function of the RP ASIC. In that case the SCC handles the lookups in software.

The RP also performs an important function, like implementing hardware based "state" graphs as mentioned in the previous graph. The RP can very quickly generate the required address offsets in the DIPS/portblock matrix for the appropriate read writes to be asserted to the right address by the SC ASIC. This function is a little complex and due to speed constraints is implemented in the RP ASIC.

The key to this function is Maintaining the logical IP address Map to Physical portblock address Map. This is the programmable interconnect portion of the IRIS Switch Fabric. By changing the logical to physical address map on each Duty Cycle the IRIS switch fabric can reconfigure itself to a geometry that is suitable for qualities associated with a particular traffic flow. As mentioned in the previous section the logical address might represent a graph that looks like a single vertex at the center of a sphere connected with the rest of the vertices that are points on the surface of the sphere. Then the edges joining the center vertex to the other vertices are of equal length and represent the physical address offsets from the original physical address. This technique can be very effectively employed in a shared memory switch to do the routing but it becomes more effective in this type of switch where the read and writes can be generated by simple logical operations by the SF Controller ASIC on the SFC once this information is known.

This map can be used to configure the Switch Fabric into all kinds of geometries. For example a toroid might be useful in routing IP address within a WAN that emulates all IP addresses connected in multiple rings connected to each other so that all of them have an equal number of nodes between themselves and a given destination as any other node in the network.

The SFCI bus is used to receive status and update information from the SFC and is used to maintain the state of the fabric in the Switch Controller ASIC or the SC. The SC contains the hardware scheduler that will schedule each read and write to individual port blocks. The schedule is done so as not to exhaust the time window allocated in the TDM based time slot allocation to each SNI, and each port within the SNI.

It is the job of the SC to take in the input from the SCC that is parsed by the SCRPC controller and keep the scheduler running. The scheduler is explained in the patent:

"Scalable Scheduler Controller for a switch Fabric,"

The data is exchanged to and from the SFC through the ports SFC1 and SFC2 using the IRIS packet protocol for exchanging data and control information. On each system clock cycle the SC ASIC will transmit the necessary information to perform a read and write to the SF (Switch Fabric) controller ASIC on the SFC.

The lookup table stored in the SCRPC memory is readable by the processor on the SCC. Accesses to the SCRPC memory are controlled by the SCRPC controller. The SCRPC controller integrates a memory controller and a address decode mechanism.

The SCRPC memory is SRAM memory that is used to store both the hardware scheduled sequencing graph that has actual entries of the portblocks or physical addresses corresponding to them. The SRPC memory is also used to store the Lookup table that is generated by the RP ASIC or the software version of the lookup engine that is part of the ISE. The address of the SRPC memory falls in the address space of the processor on the SCC and is visible to it. The processor on the SCC has read write permission to all address within the address block allocated to the SCRPC memory. To avoid coherency problems and to avoid overwrite and exception faults the space that is available to the RP ASIC as read write is only available to SC ASIC as read only and the space available to the SC ASIC as read write is available to the RP ASIC as read only. The memory map and the details are in the design documents for the Switch Router and each of the individual Cards.

System Controller (SCC)

Each packet that arrives through any of the input ports on the IRIS switch router arrives in a format that conforms to certain protocol stack conventions. Based on the type of routing that is required to be performed on the packet, the packet goes through the stages that are explained in this section. The System Controller Card or the SCC has elements that serve as the nerve center of the IRIS switch router and execute different algorithms to perform the routing and control functions.

The SCC controls the time slot assignments of each of the SNI and also determines the time slots of each of the individual ports within each SNI every duty cycle. The other function of the SCC is to work with the SCRPC to implement what is called the ISE or the Intelligent Switching Engine. The ISE has several parts to it. The core of the ISE is a constraint-based scheduler. The scheduler takes in inputs from the route lookup engine to that is the raw unscheduled sequencing graph that represents all the routes that need to be scheduled to the switch fabric in a given duty cycle. The output of this scheduler is the scheduled sequencing graph. The scheduled sequencing graph is used to generate time slots for the SNI and the ports within the SNI each duty cycle.

Figure 13:
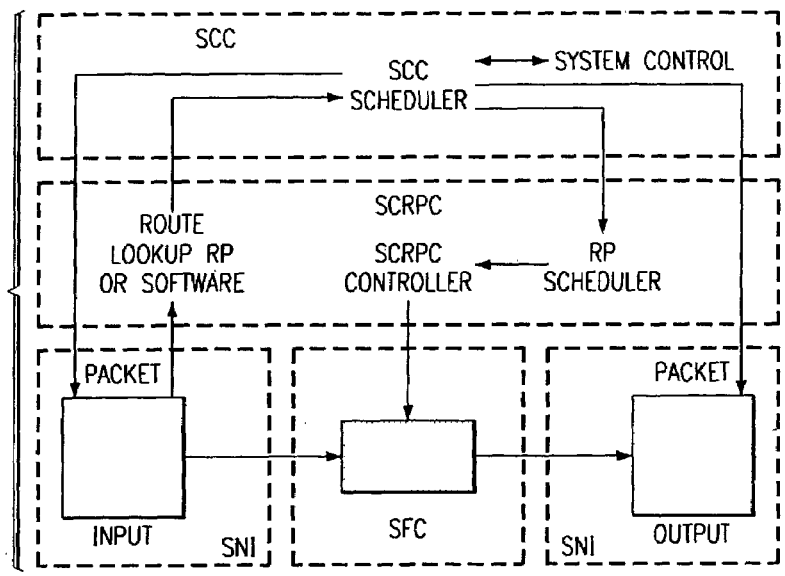
FIG. 13 shows the data flow through the IRIS switch route.

FIG. 13 shows the data flow through the IRIS switch router. Thus the functions handled by the SCC include general system maintenance. The SCC runs the RTOS that is used by the system. It also runs the thread manager that keeps track of the state of the switch by updating it's state tables based on the number of threads running at any given time. The thread manager is described in detail in the patent:

Schedulers for Fine Grained parallel Computers

Figure 14:
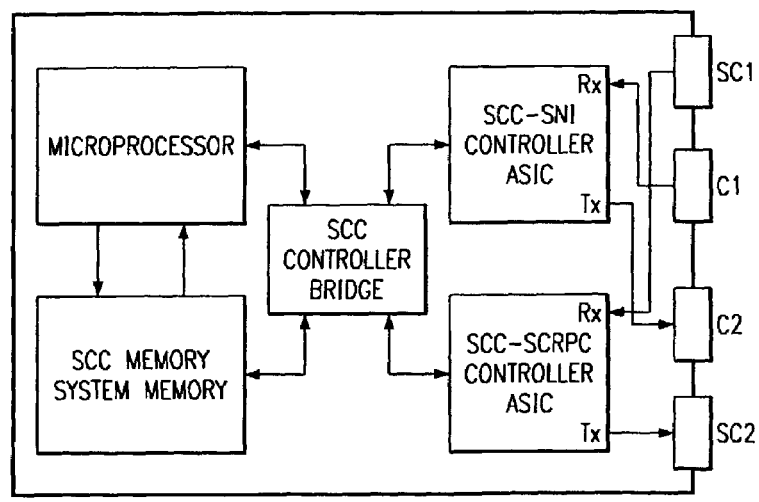
FIG. 14 is a diagram of the Switch and Controller Card SCC.

A block diagram of the IRIS SCC is shown in FIG. 14 below.

The SCC has five key elements:
The Microprocessor
The SCC Memory
SCC Controller Bridge
SCC-SNI Controller ASIC
SCC-SCRPC Controller ASIC The microprocessor on the SCC card is a standard off the shelf super-scalar RISC processor or can be made up of several of these processors based on the computing demands. It is the job of the processor to execute the software core of the ISE or the Intelligent Switching Engine. It is also the job of the microprocessor in conjunction with the RTOS being used, to run the thread manager. This tracks the state of the switch. The state of the system in terms of hardware interrupts is tied into the thread manager that will take in the system interrupts supported by the microprocessor and service them based on the state of the system.

This essentially is the nerve center of the whole switch. The microprocessor stores all the route lookup information in the SCC memory and loads it to perform route looks on a given duty cycle. The subset of the total route lookup table is loaded into the processor cache or this function can be offloaded to the RP ASIC on the SCRPC. In the case it is offloaded to the SCRPC, the processor issues the necessary commands to the SCC bridge controller as well as the SCC-SCRPC Controller ASIC to download the information to the SCRPC memory.

Additional functions that are not executed but may be part of the IRIS performance advantage arsenal are stored on the SCC memory. This memory is made of DRAM. These functions are downloaded to the appropriate cards in the system or are used by the processor on the SCC to control the functioning of the switch router. These options are selected by the user at the time of provisioning the IRIS switch router. The options can be changed at any time during the operation of the switch router without any down time.

The SCC Bridge controller arbitrates the access to the SCC memory in conjunction with the Microprocessor who is the bus master and also coordinates the communication between the microprocessor and the SCRPC ASIC as well as the SCC-SNI Controller. The SCC controller can be a simple crossbar that is controlled by the microprocessor. In the first versions of the IRIS router it will be an off the shelf crossbar IC.

The SCC-SNI control ASIC is connected to two connectors/ports that connect the SCC to each of the individual SNI through their control connectors. These two ports are C1: Receive control bus for SCC-SNI communication
C2: Transmit control bus for SCC-SNI communication The SCC-SNI controller ASIC is responsible for communicating the time slot assignments that the scheduler that is part of the ISE generates. The time slot assignments are converted into packets that conform to the IRIS data and control packet protocol and sent on C2. The updated information about the states as well as any error control and other system messages are received on the C1 from each of the individual SNI card. The SNI cards are connected to the SCC in a star fashion as shown on the backplane in FIG. 3.

The SCC-SNI interface block is similar to ++yy all the interface ASICs as shown in the block diagram for the SNI-SFI ASIC in FIG. 14. The major difference being the state machine that the controller in the ASIC implements. The header pool for the control messages is also going to be different. The separation of the control and the data planes allows for the congestion free asynchronous operation of each of the individual cards.

The SCC-SCRPC controller ASIC takes the lookup table data generated by the software portion of the ISE running on the microprocessor on the SCC and after conversion passes it on to the SCRPC. The SCC-SCRPC is connected to two connectors/ports on the back of the SCC card and they are:

SCI: Receive control bus for SCC to SCRPC messages
SC2: Transmit control bus for SCC to SCRPC messages Any messages such as the route lookup updates performed by the RP ASIC on the SCRPC are communicated to the microprocessor though this controller. These update and control messages from the SCRPC arrive on SC1. The messages as mentioned previously conform to the IRIS data and control packet protocol. The main function of the SCC-SCRPC controller is to take the microprocessor generated control messages and convert them into messages that are in the form of control and data packets to be sent to the SCRPC. The SCC-SCRPC controller takes the incoming messages from the RP ASIC and also converts them into appropriate messages for the microprocessor. These messages might involve a simple request to access the SCC memory to read or write data from it or to send a response back to the microprocessor in response to a request from one of the software engines running on it.

All the input messages/data from the SCRPC come in on port or connector SC1 and all the outgoing messages/data from the SCC to the SCRPC are sent out on SC2.

Prototyping and proof of concept demonstration will be done in two phases. Phase I will be an emulation environment which can be further developed into a comprehensive design tool that can be used for product positioning as well as marketing. This tool will generate various reports and will also be used to optimize various parameters that will be used in designing the final production system, as a function of customer inputs/requirements.

The software/firmware modules developed as part of this simulation environment will be used in the phase II as well in the final production products. The common modules across all platforms are the SCHEDULER, ROUTE PROCESSOR, and SYSTEM CONTROLLER.

The system controller in the first phase of the prototype will be built on a PC platform running windows NT and a small RTOS kernel. All the software modules will be written in C/C++; the hardware components will be designed in synthesizable VHDL. If concurrent development becomes possible due to the availability of funds then the synthesizable VHDL cores will be used to develop the ASIC being used in the system that will be common across all the platforms. The common standard parts used in every platform are: SWITCH DEVICE, BACKPLANE INTERFACE, ROUTE PROCESSOR and the SCHEDULER.

The functional block diagram shown in the FIG. 15 above can be partitioned as follows in Phase I and Phase II:

| Phase I | |
| --- | --- |
| Standard Network Interface (SNI) | C/C++ |
| SNI SFI (SNI Switch Fabric Interface) | VHDL |
| Route Processor | C/C++ |
| Scheduler | C/C++ |
| Switch Fabric | VHDL |
| Switch Fabric Controller | VHDL |
| System Controller | C/C++ |
| Phase II | |
| SNI | Hardware (off the shelf) |
| SNI SFI | Hardware (off the shelf) |
| Route Processor | Hardware/Firmware |
| Scheduler | Hardware/Firmware |
| Switch Fabric | Hardware (off the shelf) |
| Switch Fabric Controller | Hardware/Firmware |
| System Controller platform | Software on a PC platform |

Figure 15:
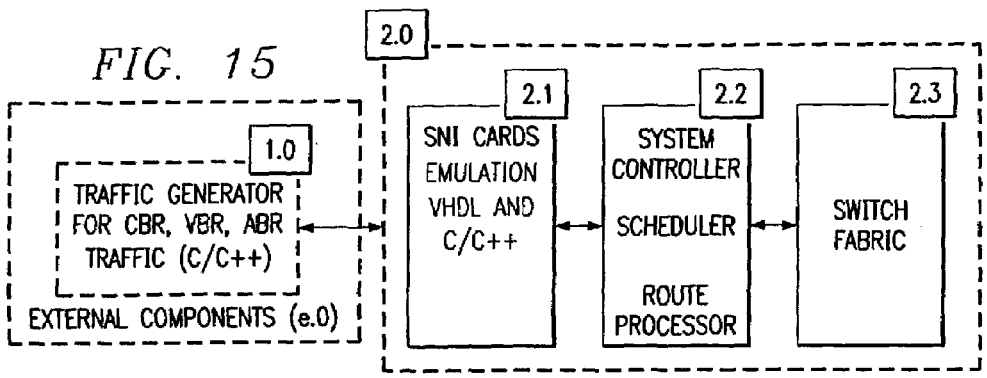
FIGS. 15 and 16 are diagrams of an integrated hardware-software platform.
Figure 16:
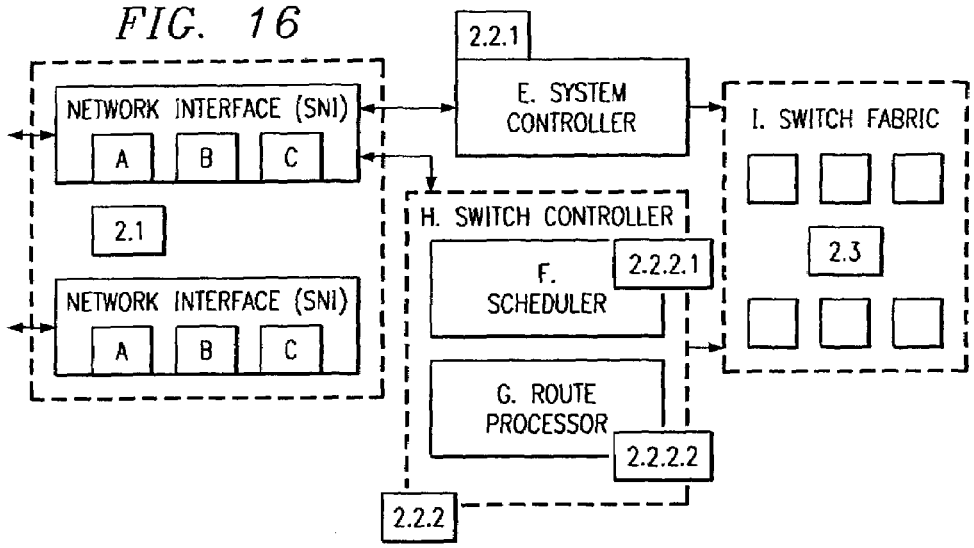

FIGS. 15 and 16. shows all these components in phase II in an integrated hardware software platform. The custom hardware will be put on an PCI card that fits into the PCI expansion slot on the PC platform being used to host the RTOS and the Software modules.

The proof of concept demonstrator will have the capacity to symmetrically switch 64 I/O 100BT ports. This can be used as an enterprise class LAN switch router is designed into a full product. Even though the proof of concept demonstrator will have the capacity to switch 64 100BT, we will only demonstrate traffic being symmetrically switched with QoS between four platforms, as 64 100BT ports are difficult to install on a PCI card.

4. Phase I: Modules (Software modules & Interfaces)

All modules will be implemented in software for phase I (C, VHDL). The interfaces will be purely software. This will allow for loosely defined boundaries in the first run of the prototype. It'll also allow time for decision regarding embedded platform to be used, such as Win32, PowerPC etc. Further this phase will allow us to generate performance and design metrics.

Figure 17:
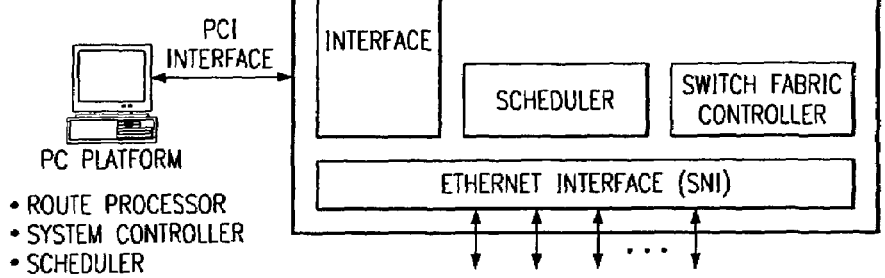
FIG. 17 is a high level block diagram of a system software model.

The high-level functional blocks are as shown in FIG. 17. Each block is an independent software module. Some of these modules may be replaced in future by an off-the-shelf hardware, ACIC etc. Further all of the software modules will have interfaces defined such that changes (e.g. Routing Algorithm) can be accommodated with relative ease.

4.1 Notation: The following notation is used to represent various parts of this prototype. Components that are part of the Iris Platform are identified by 'I' (for Iris) followed by the specific component # (e.g. 1. for SNI) followed by sub-part of that component (e.g. 1 for PHY layer interface). So PHY Layer interface specification will be tracked under component number "1.1.1". Components that are external to the Iris Platform will be identified by 'E' (for external) followed by the specific component and if there is one, by the sub-part of that component. For example the Traffic Generator specification will be tracked under component number "E.1".

4.2 External Components

4.2.1 Traffic Generator (E.1)

The traffic generator section of the simulation environment is coded entirely in C/C++. Three kinds of sources are modeled that emulate different kinds of traffic, CBR, VBR and ABR. A combination of any of these three sources can be connected to any port on the IRIS switch/routing platform. The traffic generation portion of the simulation environment will include a combination of multiple such sources.

CBR sources are usually used to represent voice and streaming data applications. VBR traffic is used to represent digital video or other transmission quality video traffic. ABR traffic usually corresponds to traffic associated with file transfer, mail applications and other common Internet applications such as browsers etc. This traffic is usually made up of TCP frames/packets on layer 4.

4.2.1.1 CBR Traffic Source

CBR stands for Constant Bit Rate traffic. Constant bit rate as the name implies is traffic that for the duration of the transmission generates a constant bit stream from the source. An example of an application that generates this kind of traffic is a voice application such as basic telephony. However over a large sample of users the pattern of usage of the telephone lines follows a poisson distribution.

Figure 19:
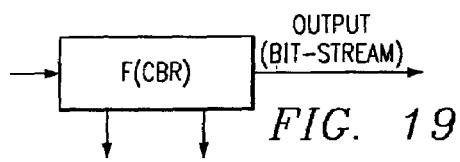
FIG. 19 is a block diagram of a constant bit rate (CBR) source.

The CBR source is shown in FIG. 19 with the (interfaces) inputs and outputs shown. FIG. 19. Block diagram of the CBR Traffic Source Inputs There will be three inputs to this module. They are listed below:

Enable

Enable is the signal asserted to the source to start generating the traffic that corresponds to F(CBR) or the function/distribution that is used to indicate CBR traffic.

Source (IP) address

This designates the address of the origin of the traffic. If this source is placed in a network and is generating the traffic then the address that is given as part of the source IP address corresponds to this source block itself.

Destination (IP) address

The destination address is the address to which this source is connected within the network. In the simulation platform this will correspond to the Sink IP address and accordingly the port address on the IRIS switch routing platform. The format of the IP address is used to designate any source in the network will follow the standard IP address format:

000.000.000.000

This address will be used to set the corresponding bits in the header for all the traffic originating from this source.

Outputs Each source generates three output signals. They are:

Output data.

The output data corresponds to the structured bit-stream that is generated in a packet format that corresponds to the physical layer packets. When the simulation is being done in an IP network environment then all the corresponding layer protocols will map to the IP protocol stack. Thus layer 3 protocol will be IP, layer 2 will be Ethernet and the physical layer will be one of the commonly used transport protocols.

Idle

Idle signal indicates the status of the source. If the source is not generating any traffic, i.e. the corresponding output data then the idle flag is set which is visible to the external system. A status of '1' indicates that the source is IDLE, a status of '0' indicates that the source is ACTIVE. IDLE=NOT (ACTIVE).

Active

The active flag indicates weather the source is actively transmitting or generating data in the network. If the source is generating data at a given instance of time this active flag is set. A status of '1' indicates that the source is ACTIVE, a status of '0' indicates that the source is IDLE. ACTIVE=NOT (IDLE).

Configurable Parameters

Source (IP) address

This designates the address of the origin of the traffic. If this source is placed in a network and is generating the traffic then the address that is given as part of the source IP address corresponds to this source block itself.

Destination (IP) address

The destination address is the address to which this source is connected to within the network. In the simulation platform this will correspond to the Sink IP address and accordingly the port address on the IRIS switch routing platform. The format of the IP address is used to designate any source in the network will follow the standard IP address format: 000.000.000.000

This address will be used to set the corresponding bits in the header for all the traffic originating from this source.

4.2.1.2 VBR Traffic Source

VBR stands for variable bit rate traffic. Variable bit rate is generated by applications that have interactivity or broadcast requirements. Usually point-to-point traffic has CBR characteristics in given block of time. A common application that generates traffic that follows VBR type pattern is digital video. Other applications that would generate VBR traffic patterns would be video conferencing and interactive video games.

Figure 20:
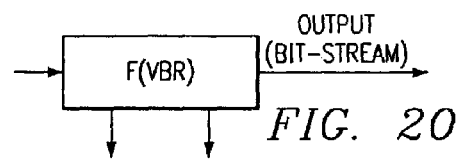
FIG. 20 is a block diagram of a variable bit rate (VBR) source.

A VBR source with it's inputs and outputs is shown in FIG. 20 below. There will be three inputs to this module. They are listed below:

Enable

Enable is the signal asserted to the source to start generating the traffic that corresponds to F(VBR) or the function/distribution that is used to indicate VBR traffic.

Outputs

Each source generates three output signals. They are:

Output-data

The output data corresponds to the structured bit-stream that is generated in a packet format that corresponds to the physical layer packets. When the simulation is being done in an IP network environment then all the corresponding layer protocols will map to the IP protocol stack. Thus layer 3 protocol will be IP, layer 2 will be Ethernet and the physical layer will be one of the commonly used transport protocols.

Idle

Idle signal indicates the status of the source. If the source is not generating any traffic, i.e. the corresponding output data then the idle flag is set which is visible to the external system. A status of '1' indicates that the source is IDLE, a status of '0' indicates that the source is ACTIVE. IDLE=NOT(ACTIVE).

Active

The active flag indicates weather the source is actively transmitting or generating data in the network. If the source is generating data at a given instance of time this active flag is set. A status of '1' indicates that the source is ACTIVE, a status of '0' indicates that the source is IDLE. ACTIVE=NOT (IDLE).

Configurable Parameters

Source (IP) address

This designates the address of the origin of the traffic. If this source is placed in a network and is generating the traffic then the address that is given as part of the source IP address corresponds to this source block itself.

Destination (IP) address

The destination address is the address to which this source is connected to within the network. In the simulation platform this will correspond to the Sink IP address and accordingly the port address on the IRIS switch routing platform. The format of the IP address is used to designate any source in the network will follow the standard IP address format: 000.000.000.000

This address will be used to set the corresponding bits in the header for all the traffic originating from this source.

F(VBR)

The function that represents the distribution that the bit stream follows is designated as F(VBR). F(VBR) will designed as a variable bit rate stream with the bits being generated at the required frequency. Additional features such as controlling the stream by varying the time parameters will also be allowed.

4.2.1.3 ABR Traffic Source

Figure 21:
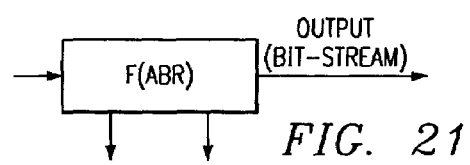
FIG. 21 is a block diagram of an available bit rate (ABR) source.

ABR stands for available bit rate traffic. Available bit rate is generated by applications that have interactivity or broadcast requirements. A common application that generates traffic that follows ABR type pattern is file transfer. Other applications that would generate ABR traffic patterns would be e-mail, web page viewing or other forms of data transfer. An ABR source with it's inputs and outputs is shown in FIG. 21. below Inputs There will be one input to this module. They are listed below:

Enable

Enable is the signal asserted to the source to start generating the traffic that corresponds to F(ABR) or the function/distribution that is used to indicate ABR traffic.

Outputs

Each source generates three output signals. They are:

Output-data

The output data corresponds to the structured bit-stream that is generated in a packet format that corresponds to the physical layer packets. When the simulation is being done in an IP network environment then all the corresponding layer protocols will map to the IP protocol stack. Thus layer 3 protocol will be IP, layer 2 will be Ethernet and the physical layer will be one of the commonly used transport protocols.

Idle

Idle signal indicates the status of the source. If the source is not generating any traffic, i.e. the corresponding output data then the idle flag is set which is visible to the external system. A status of '1' indicates that the source is IDLE, a status of '0' indicates that the source is ACTIVE. IDLE=NOT(ACTIVE).

Active

The active flag indicates weather the source is actively transmitting or generating data in the network. If the source is generating data at a given instance of time this active flag is set. A status of '1' indicates that the source is ACTIVE, a status of '0' indicates that the source is IDLE. ACTIVE=NOT (IDLE).

Configurable Parameters

Source (IP) address

This designates the address of the origin of the traffic. If this source is placed in a network and is generating the traffic then the address that is given as part of the source IP address corresponds to this source block itself.

Destination (IP) address

The destination address is the address to which this source is connected to within the network. In the simulation platform this will correspond to the Sink IP address and accordingly the port address on the IRIS switch routing platform. The format of the IP address is used to designate any source in the network will follow the standard IP address format: 000.000.000.000

This address will be used to set the corresponding bits in the header for all the traffic originating from this source.

F(ABR)

The function that represents the distribution that the bit stream follows is designated as F(ABR). F(ABR) will designed as a variable bit rate stream with the bits being generated at the required frequency. Additional features such as controlling the stream by varying the time parameters will also be allowed. The user can also select from multiple number of functions of the type ABR that are presented to him/her as options.

4.3 The IRIS Platform

Figure 18:
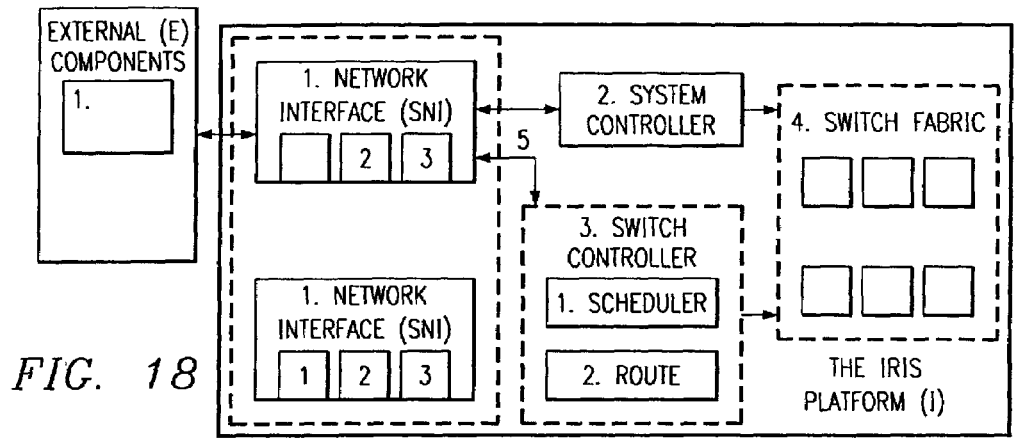
FIG. 18 is a high level diagram of an IRIS platform.

The IRIS platform as shown in the FIG. 18 includes the following components:

SNI Cards
System Controller
Route Processor
Scheduler
Switch Fabric and Switch Controller The SNI or Standard Network Interface cards are the actual physical cards that host the network interfaces. These interfaces are one of the commonly used standard network interfaces. These interfaces will include but are not limited to, ATM/SONET, FDDI, Gigabit Ethernet, Ethernet, DWDM, etc.

4.3.1 The Standard Network Interface (SNI) card (I.1)

The SNI or Standard Network Interface cards are the actual physical cards that host the network interfaces. These interfaces are one of the commonly used standard network interfaces. These interfaces will include but are not limited to, ATM/SONET, FDDI, Gigabit Ethernet, Ethernet, DWDM, etc.

Figure 22:
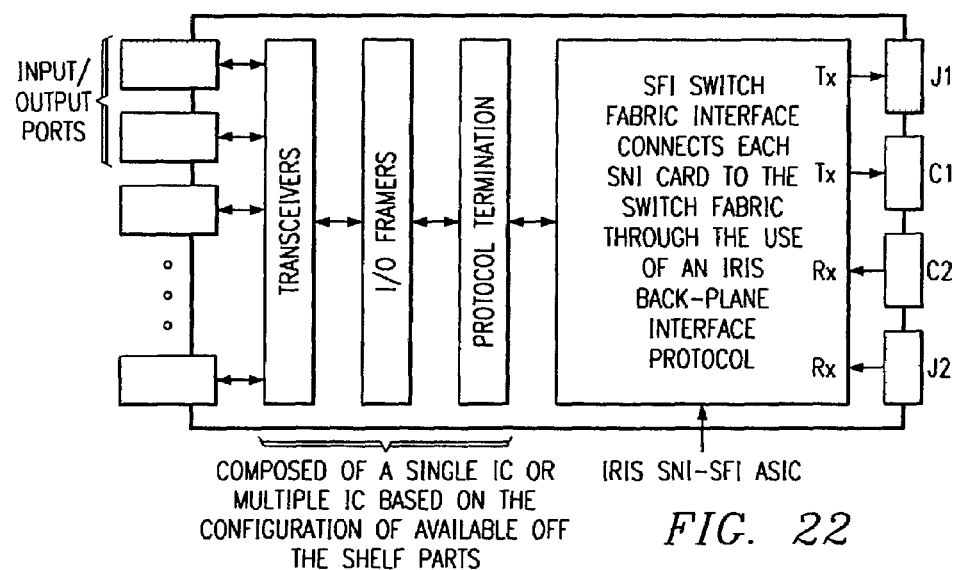
FIG. 22 illustrates the architecture of an IRIS standard network interface.
Figure 23:
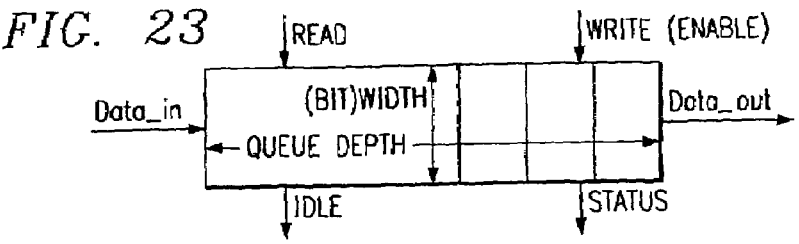
FIG. 23 shows the conceptual input queue structure.

The SNI card can be functionally as well as logically depicted as shown in FIG. 22. The front end of the SNI card consists of all the RF interfaces that connect the IRIS platform to other network elements by this physical layer connection. The next stage as shown in FIG. 23 will consist of a framer/de-framer portion. The third stage in the card consists of a protocol termination stage that will take care of functions that over lap between layer two and layer three.

The protocol termination block will take the incoming layer 2/layer 3 packet and then strip the header and send onto the Switch Controller Card (SCC). The SCRPC will then take the associated header and then perform the route lookup functions.

The last block is the SNI-SFI interface block. The SNI-SFI (Standard Network Interface-Switch Fabric Interface) interface takes the data that is associated with each packet that comes on a physical port on an SNI and inputs it into the SSM (Scalable Switch Matrix).

The SNI-SFI block will generate packets that are based on a proprietary protocol that is used by IRIS technologies for intra-system communication at the physical layer. The physical layer protocol preserves the higher layer characteristics of data.

The SNI card has two interfaces to the rest of the system. They are numbered J1 and J2, these are two unidirectional data ports that connect the SNI card to the back-plane. The other two ports are C1 and C2, these two are control ports that connect the SNI card to the SCC or the System Controller Card.

Figure 24:
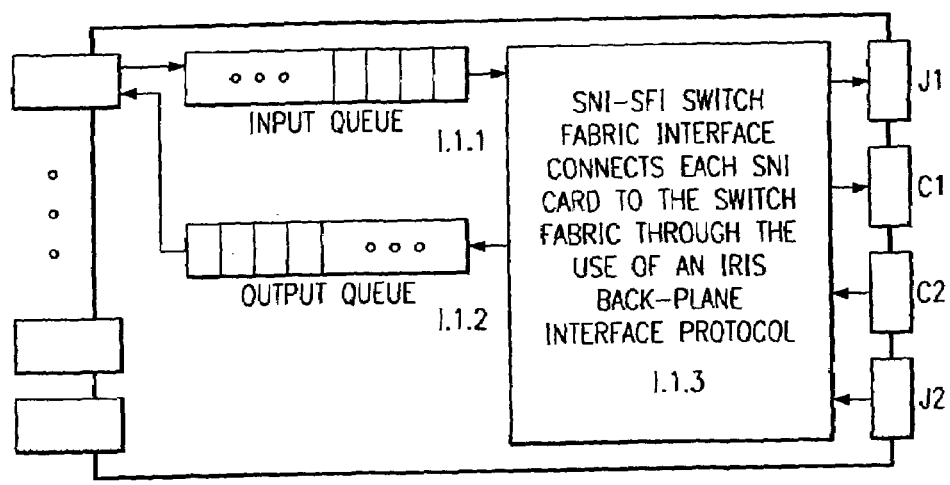
FIG. 24 shows a standard network interface (SNI) card.

For the purposes of the first phase of the simulation the SNI card will have the structure shown in the FIG. 24. Each physical port will be simulated with a queue structure that implements a FIFO logically and stores the incoming packets. The queue (I.1) will emulate the first three stages of the SNI. Each of the queues have several characteristics that are configurable as listed in the following sections. The data rate of the incoming bitstream on each queue is one of the key configurable parameters. All the I/O ports on an SNI card will have the same speed. Any two ports from two distinct SNI cards may differ in speed, i.e. the rate at which they accept data stream on the input.

Protocol termination is treated as a configurable parameter that allows for error control in terms of the proper speed and type of source being connected to the proper speed and type of port. Since interconnect between the sources and the physical ports is user configurable, the nuances of error checking are abstracted from the user interface that allows the user to determine the interconnect topology between the sources and the input ports on an SNI.

4.3.1.1 Input Queue

Input queue has the structure shown in FIG. 23. The input queue will queue all the packets that are received from various sources that are connected to the port associated with the input queue. The input queue is implemented as a FIFO with the provision that the read and write pointer can be moved around with random increments. This will be set as a flag or a property that can be toggled on and off. The random movement of the pointer allows one to push QoS based reading of data that has arrived out of sequence to be read in sequence for input into the switch. This function however is reserved as it complicates the scheduling and routine block.

Inputs

There are three inputs to the input queue, they are

Data_In

This is the input data that is generated by all the sources connected to this input queue. The input data will conform to the protocol stack that the source generates. The data that is stored in this input queue is going to be structure that is used for the physical layer. The type of protocol stack used, is determined by the type of the source that is connected to the physical port or queue. The speed at which a single bit of data arrives and fills the entries in the queue is determined by the matching speeds of the source and the queue/port. If the data rates of the source and the port do not match then they cannot be connected in an interconnect topology.

Read

The read signal is asserted to read data out of the queue/port. This signal is going to be asserted by the local SNI controller or the SNI-SFI ASIC that will take the data that is queued in the input queue, parse it and pass the header from a higher layer on to the SCC based on the protocol termination that is applied to the input queue. Every read operation updates the read pointer.

Write

The write signal is always asserted under normal conditions to allow data to be written into the input queue from external sources. These external sources are the traffic generators that are connected to this queue/port. The read and write operations from and to the queue are asynchronous. This allows for simultaneous reading of the data from the queue while the network element connected to the queue is filling the queue with new data. Every write operation updates the write pointer.

Outputs

There are three outputs to the input queue. These are listed below:

Idle

Idle signal indicates the status of the queue. If the queue is not active, i.e. there is no data being written to the queue or being read from the queue, the queue goes into idle state. A status of '1' indicates that the queue is IDLE, a status of '0' indicates that the queue is ACTIVE. IDLE=NOT(ACTIVE).

Status

Status indicates the status of the queue. This signal or output is continuously generated. The queue is constantly delivering to the rest of the system and the SNI card the status relating to the number of packets in the queue, the speed of the data stream that is coming into the queue. The status bits also indicate the general health of the queue in terms of the overflow time . . . this will indicate the number of entries available before overflow occurs. This can be used to generate an alarm for the queue to be serviced. Thus any queue that generates an overflow pending alarm, taken together with the data rates of the data coming into the queue one can generate a heuristic that can be used to schedule read operations to the appropriate queues.

Data_Out

Data out is the data that is equivalent to one packet that is streamed from the queue in response to the assertion of a read. The data stream has the format of a raw bit stream which corresponds to the body of the physical layer packet sans the header. The header is parsed and sent off for processing to the system controller before the read signal is asserted to the input queue.

Configurable Parameters

There are several configurable parameters that are going to be part of the input queue they are listed below:

Width

This is the width of each of the entries in the queue in bits. This will vary depending on the speed of the node connected to the queue as well as the size of the switch. Queues that handle higher speed elements or bit streams will be wider than those that handle slower speed streams. The design of input queue bit width is based on the size of the switch, the total capacity of the switch, the speed of the ports and the mix on the switch.

Depth

This is the number of entries of width configured above that can be stored in the queue. The number of entries in the input queue is limited compared to the output queue. The depth of the output queue is more. The input queue can be configured to hold between 1 to 1000 entries. This is assuming an average IP packet size of 150 bytes that is equivalent to 1200 bits. Smallest queue width is going to be 64 bits thus a 1000 entry queue will provide for the capacity to hold 64,000 bits or approximately 50 IP packets of average size. If ATM cells are being stored in the input queues then since the size of the ATM cell is fixed one can store a lot more in the depth of 1000 entries considered as an example.

Synchronous/Asynchronous Toggle

The queue will have the provision of a synchronous and asynchronous toggle that allows it to be set so that the read and write pointers have to be updated by the same amount of offsets. If this toggle is not set then the amount of data that is streamed into the queue is not equal to the amount of data read out of the queue. This allows for the queue to operate asynchronously both logically and functionally. Functionally, one can keep writing variable length packets into the queue and one can asynchronously read the HOL (Head of Line) packet asynchronously. Logically it allows for the separation of the clock domains. The system clock (100 MHz) is isolated from the network clock that depends on the speed at which the bit stream is generated. The network clock in this case is the physical layer data rate.

Not setting this toggle allows for a logical asynchronous operation of the queue but not a functional asynchronous operation. Then patterns where traffic that goes in must come out of the switch can be routed or switched to more accurately model overflow of the input queues/buffers. In the case of report generation these benchmarks can be used to predict the upper limit of the capacity of the scheduler.

Figure 25:
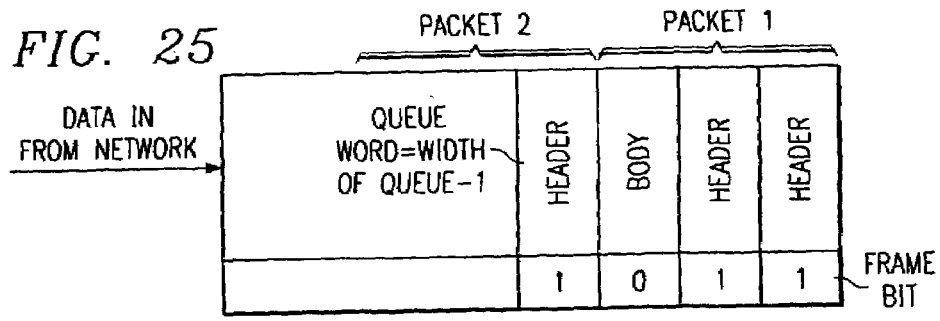
FIG. 25 shows the physical structure of the input queue.

The physical structure of the input queue associated with each input output port on the SNI is going to be as shown in the FIG. 25.

The width of the queue is assigned by the designer based on the serial speed of the port it is associated with. Each entry in the queue that contains the relevant data is called the queue word. The size of the queue word is going to be in bits:

Queue word=Width of queue−1

The depth of this queue is going to be decided by simulation. Optimal configuration of the switch will require a certain optimal depth of the input as well as output queues that will be a report generated as a result of the simulation.

The frame bit demarcates packet boundaries. When the frame bit is set, it indicates the presence of a header in that entry of the queue or that queue word contains the header. If the header occupies more than one entry in the queue, as might be the case with certain network protocols, the frame bit is set for the consecutive entries into which the header is stored. And subsequently the frame bit is not set in the rest of the entries where the body of the packet is stored. The start of the new packet is indicated by the change of the frame bit from 0 to 1. Thus in a sequence of flag bits such as 110000100111000, we find that the first packet is of a length that is equal to 6 queue words of which the header occupies two queue words and the body of the packet occupies 4 queue words. The next packet is of a size that is equal to three queue words, of which the header occupies one queue word and the body of the packet occupies two queue words.

4.3.1.2 Output Queue

Figure 26:
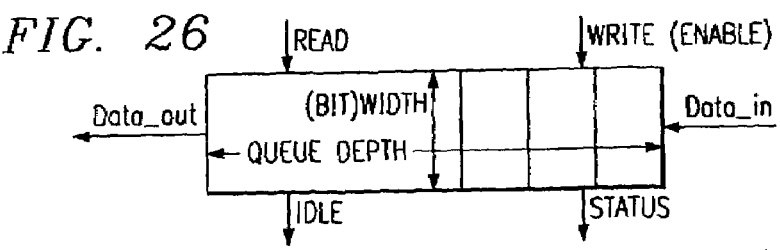
FIG. 26 illustrates the conceptual output queue structure.

Output queue has the structure shown in FIG. 26. The output queue will queue all the packets that are received from the switch. These packets arrive in a deterministic fashion from the switch based on the scheduler outputs. The output queue is implemented as a FIFO with the provision that the read and write pointer can be moved around with random increments. This will be set as a flag or a property that can be toggled on and off. The random movement of the pointer allows one to push QoS based reading of data that has arrived out of sequence to be read in sequence for input into the switch. This function however is reserved as it complicates the scheduling and routing block.

The output queue has more depth compared to the input queue. Typical ratios of depth of the output and input queues will be based on the ratio between the highest speed port on the switch to the slowest speed port. The depth of the output queue that is connected to a network element on a slower speed port will have more depth than that connected to a higher speed port. For example if the switch has 1 OC-192 port and ten 100BT ports the depth of the output port on the 100BT ports is 1000 times that of the one on the OC-192 port. This is because an OC-192 port generates 1000 times more traffic than a 100BT port. This to avoid overflows internal to the switch.

There are three inputs to the output queue, they are

Data_in

This is the output data that is generated by the switch port or portion thereof connected to this output queue. The data that is stored in this output queue is going to follow a structure that is used for the physical layer. The speed at which a single bit of data arrives and fills the entries in the queue is determined by the speed of the back-plane and the switch fabric. The switch fabric is going to run at the system clock speed of 100 MHz. Thus if the entire data path and all the elements along it are operating in a synchronous manner the data rate is going to be width of the queue×100 MHz, for example if the queue has a width of 64 bits data is going to come in at the rate of 6.4 Gbps.

Read

The read signal is asserted to read data out of the queue/port. This signal is going to be asserted by the local SNI controller or the SNI-SFI ASIC that will send the data that is queued in the output queue to the network element that is connected to the queue. Every read operation updates the read pointer.

Write

The write signal is always asserted under normal conditions to allow data to be written into the output queue from the switch fabric. This signal will be asserted according to the window assigned for a write to this queue by the scheduler that runs on the system controller. The read and write operations from and to the queue are asynchronous. This allows for simultaneous reading of the data from the queue while the switch connected to the queue is filling the queue with new data. Every write operation updates the write pointer.

Outputs

There are three outputs to the input queue. These are listed below:

Idle

Idle signal indicates the status of the queue. If the queue is not active, i.e. there is no data being written to the queue or being read from the queue, the queue goes into the idle state. A status of '1' indicates that the queue is IDLE, a status of '0' indicates that the queue is ACTIVE. IDLE=NOT (ACTIVE).

Status

Status indicates the status of the queue. This signal or output is continuously generated. The queue is constantly delivering to the rest of the system and the SNI card the status relating to the number of packets in the queue, the speed of the data stream that is coming into the queue. The status bits also indicate the general health of the queue in terms of the overflow time . . . this will indicate the number of entries available before overflow occurs. This can be used to generate an alarm for the queue to be serviced. Thus any queue that generates an overflow pending alarm, taken together with the data rates of the data coming into the queue one can generate a heuristic that can be used to schedule read operations to the appropriate queues.

Data Out

Data out is the data that is equivalent to one packet that is streamed from the queue in response to the assertion of a read. The data stream has the format of a raw bit stream which corresponds to the body of the physical layer packet plus the header.

Configurable Parameters

There are several configurable parameters that are going to be part of the input queue they are listed below:

Width

This is the width of each of the entries in the queue in bits. This will vary depending on the speed of the node connected to the queue as well as the size of the switch. Queues that handle higher speed elements or bit streams will be wider than those that handle slower speed streams. The design of output queue bit width is based on the size of the switch, the total capacity of the switch, the speed of the ports and the mix on the switch.

Depth

This is the number of entries of width configured above that can be stored in the queue. The depth of the output queue is more than the input queue. The output queue can be configured to hold between 100 to 10000 entries. This is assuming and average IP packet size of 150 bytes that is equivalent to 1200 bits. Smallest queue width is going to be 64 bits thus a 1000 entry queue will provide for the capacity to hold 64,000 bits or approximately or 50 IP packets of average size.

Synchronous/Asynchronous Toggle

The queue will have the provision of a synchronous and asynchronous toggle that allows it be set so that the read and write pointers have to be updated by the same amount of offsets. If this toggle is not set then the amount of data that is streamed into the queue is not equal to the amount of data read out of the queue. This allows for the queue to operate asynchronously both logically and functionally. Functionally, one can keep writing variable length packets into the queue and one can asynchronously read the HOL (Head of Line) packet asynchronously. Logically it allows for the separation of the clock domains. The system clock (100 MHz) is isolated from the network clock that depends on the speed at which the bit stream is generated. The network clock in this case is the physical layer data rate.

Not setting this toggle allows for a logical asynchronous operation of the queue but not a functional asynchronous operation. Then patterns where traffic that goes in must come out of the switch can be routed or switched to more accurately model overflow of the input queues/buffers. In the case of report generation these benchmarks can be used to predict the upper limit of the capacity of the scheduler.

4.3.1.3 SNI-SFI ASIC (VHDL)

SNI-SFI (Standard Network Interface-Switch Fabric Interface) ASIC has several functions. These functions can be summed up as connecting the SNI to the rest of the IRIS system through the connectors at the back of the SNI. These connectors are: J1 and J2 that are used to transmit the data to and from SNI to the SFC. There are two control connectors labeled C1 and C2 that are used to connect the SNI to the System Controller Card (SCC).

J1, J2, C1 and C2 can be either electrical or optical. It is better to design the system for evolution, thus optical interfaces are the ideal choices. Thus in the actual implementation of the J1 and J2 connectors and the C1 and C2 interfaces there will be an optical transceiver that interfaces with the SNI-SFI ASIC.

Figure 27:
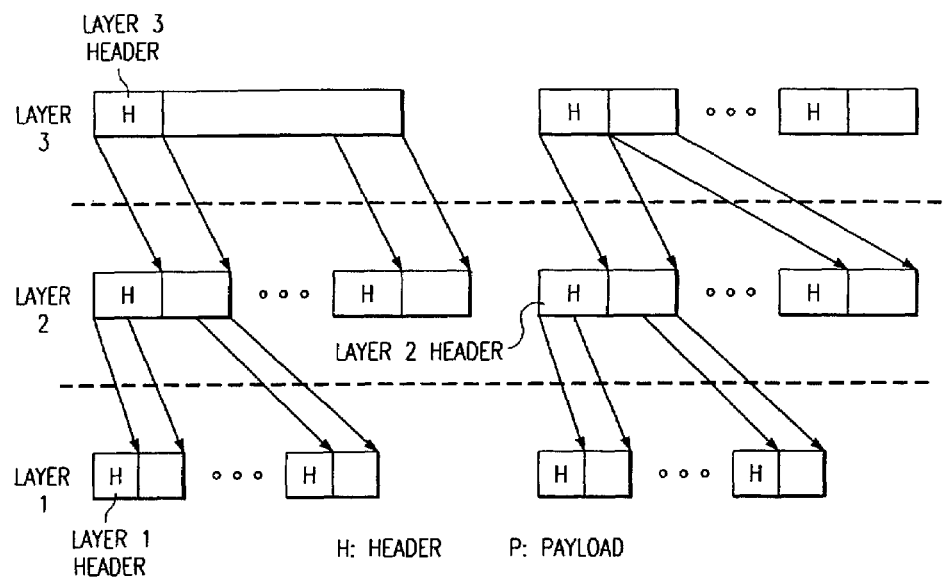
FIG. 27 illustrates the layered encapsulation of headers into data packets.

Data comes in serially through each of the physical interface ports on the SNI card. This data is put into registers and is queued so that it can be passed up to the system controller to be processed. In a serial stream the first few bits will always contain the header. Since the header is encapsulated into the lower layer packets the lower layer packets contain the header of that particular layer. This process is shown in FIG. 27. The higher layer header needs to be extracted and passed on to the ISE (Intelligent Switching Engine) running on the SCC (System Controller Card).

The encapsulation process involves taking the packet at the higher layer and converting it into the packets at the lower layer. There are several references available on how to this and a common technique being employed is called tunneling. In tunneling the controller at the lower layer looks at the higher layer header and router the lower layer packets. This can be implemented in the software portion of the system controller and is beyond the scope of this document.

As is shown in FIG. 27, the packet at layer 1 will contain subset of the layer 2 packet that are fragments of the layer 2 header or the payload. The boundaries of the frames or packets will be designated usually by a framing convention used in the PHY layer protocol. Usually in most protocols there is a frame bit that is transmitted with each new frame. After the header is received by the SNI-SFI ASIC, it is passed on through the control connector C1 to the route lookup engine that is part of the SCC (System Controller Card). The data bits associated with the header of the incoming packet are stored in a common global register that is accessible to the route lookup engine that runs on the SCC. This route lookup engine and the scheduler are part of the Intelligent Switching Engine or ISE software that is unique to IRIS platforms.

This is done in response to the read enable and other control information received from the SCC through connector C2. This operation is controlled by the ISE running on the SCC. The ISE uses a dynamic TDM scheduler to assign read and write windows to each of the SNI cards and the ports within the SNI card. The time slot assignment to each SNI card for a sequence of system clock cycles is static. It will change however in what is called a duty cycle. The duty cycle is the time it takes to service all the ports in a particular IRIS switch router for a given system clock operation speed (100 Mhz). This duty cycle normalizes the random data flows into the IRIS box from the external inputs.

There is a dynamic mode that can be set in the ISE that will change the time slot assignments to each of the ports based on the type of flows being input to the system. This is covered in the patent, "Composite Dataflow Modeling Function." This allows the ISE to track the random inputs to the switch and create a composite model for the traffic coming in. This function can be implemented in a co-processor DSP on the SCC, in software as part of the ISE or in hardware as part of the route processor ASIC. If this function is implemented in hardware as part of the route processor ASIC then this will generate the label assignments to each of the flows dynamically every clock cycle. This will be explained in detail in the SCRPC (Switch Controller Route Processor) section and the SCC (System Controller Card) sections.

The time slot assignments as controlled by the ISE on the SCC are shown in FIG. 6. Thus each SNI card is assigned a read slot and a write slot. During the read cycle data is read from each individual port on the card. This data can be a header or actual payload of the packet.

Data from each port is written into global registers that are visible to higher layer control blocks in the IRIS system, in particular the SCC. These registers emulate input queues for each of these physical ports. The width of each of these registers is determined by the width of switch fabric input ports. As will be explained in the SFC (Switch Fabric Card) section, the port width of the SFC is scalable linearly. Thus the smallest port width possible is the port width of each DIPS ASIC device.

The method that the designer should use to size these registers is, the slowest port on the SNI-SFI is assigned input and output registers that are 64 bits wide. The parameter that sets the limit on how many lower speed links can be serviced is the design of the fabric and size of the registers that are assigned to the higher speed ports. In the above example if a port that is 256 bits is assigned to an OC-48 port then it takes the OC-48 port about 103 ns to fill the register. This is because the data on the OC-48 port is coming in serially at the rate of 2.5 Gbps.

Figure 28:
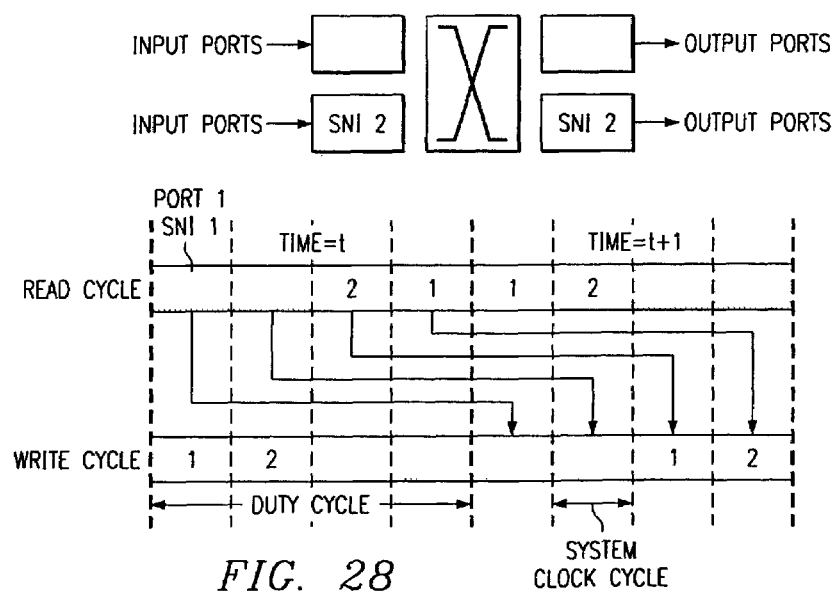
FIG. 28 is a diagram showing a time slot arrangement for the transmission of data within the system.

FIG. 28. Time Slot Assignments to SNI and Ports in an IRIS Switch Each DIPS device, as shown in FIG. 10, has one input port and one output port of width=64 bits. Since the input port of the switch fabric is formed by linearly placing several of these DIPS devices in a row the maximum width of the input port is 64x# of DIPS in a row in the SFC. As an example let's assume that the fabric has 4 DIPS devices in a row that means an input port width of 256 bits and an output port width of 256 bits.

If the Switch Fabric and the system is running at 100 Mhz then a switch that is 256 bits wide can service 10 OC-48 physical ports each clock cycle=(256/(2.5 Gbps))*(100 Mhz). Let's assume on the trunk interface only two OC-48s are required. The router is being used as an edge router. That means there are 8 OC-48 slots open. These slots can be used to service multiple 100 BT where the links are running at 100 Mbps. The total number of 100 BT that can be serviced is =200=(8×2.5 Gbps)/(100 Mbps). This configuration forms a true wire-speed router that can symmetrically switch any input data on 200 100BT ports and 2 OC-48 ports to output on 200 100BT ports and 2 OC-48 ports. Adding QoS based time slot queuing and de-queuing priorities allows one to either increase the density of ports or increase the throughput.

Figure 29:
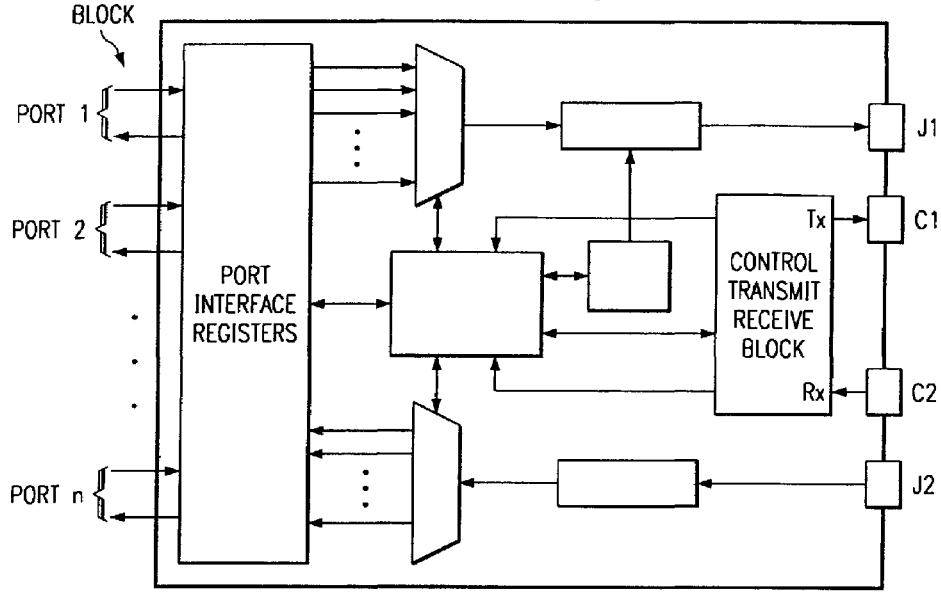
FIG. 29 is a high level block diagram of the architecture of the SNI—SNC interface card.

For a larger system or one with higher density, only the SFC card needs to be replaced together with the SNI cards, the SCC card does not need to be replaced. This allows the service provider or the end user of the IRIS system to mix and match interface cards according to their evolving network and the demands in that network. The internal architecture of the SNI-SFI ASIC is shown in FIG. 29.

For a wider switch for example that has port that is 4096 bits wide, one can symmetrically switch at wirespeed about (4096/(10 Gbps))*(100 Mhz)=40 OC-192 ports on the input and 40 OC-192 ports on the output in a single chassis. This same combination of SCC and SFC can be used to switch about (4096/(2.5 Gbps))*(100 Mhz)=160 OC-48 on the input and 160 OC-48 on the output symmetrically at wirespeed. This configuration of the IRIS router can also do a packet by packet routing of the data on each of the ports.

Another key function of the SNI-SFI ASIC is to tag each of registers with a header when they are sent into the switch matrix on the SFC. This header allows the SNI-SFI to create IRIS packets that are used to carry payload between the SNI and the SFC. The header is used to keep track of packets associated with the same flow as well as the sequence of packets in the flow.

The port interface registers can be viewed as forming two queues for each input port. One of the queues is the header queue and the other one is the data queue in which the body of the packet is stored. To maintain coherence between the input and the output section of the system the whole end-to-end flow operates as a simple FIFO. This allows the elimination for need of special error detecting mechanisms. The structure of both of these queues is shown below, in FIG. 30.

As shown above a frame bit is again used to demarcate boundaries between the headers as well as data that are parts of the packet. Thus a frame bit is set in the header queue to distinguish between different headers and it is set in the data queue to distinguish between bodies of different packets.

Figure 30:
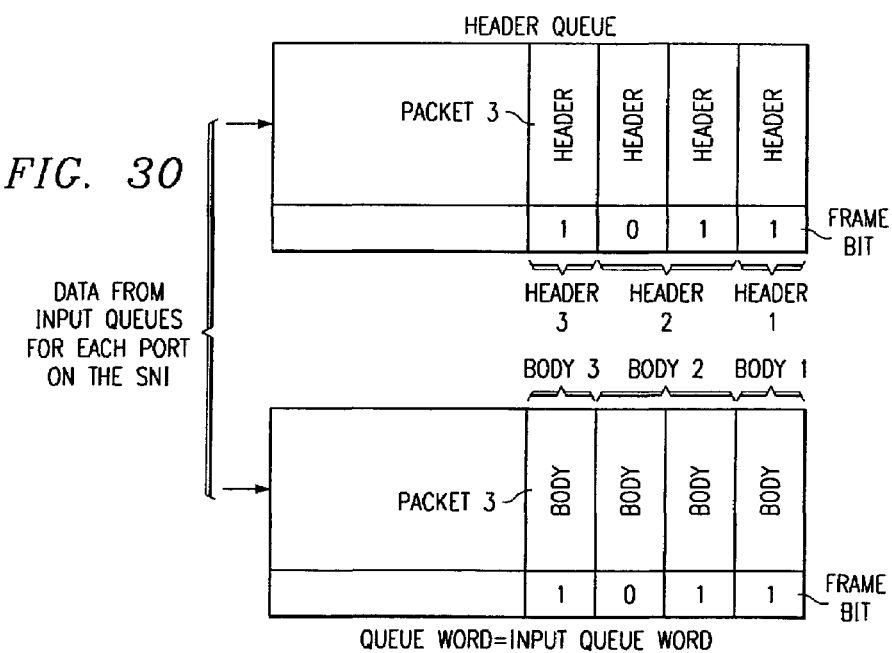
FIG. 30 illustrates the physical queue structure for transmission of data within the system.

The data packet associated with the header that is stripped from each incoming packet is tagged with an internal header that is used as part of the packet protocol to internally communicate within the IRIS system. The structure of the packet that is used to communicate between different nodes in the IRIS system is shown in FIG. 30.

There are two planes in which the IRIS system operates, the data plane and the control plane. Thus, the header queue that is part of the interface registers is in the control plane and the data queue that is part of the interface registers is going to be in the data plane. Separate protocols are used for communicating between the entities in the header plane and the data plane. The data plane protocol has a simple 10-bit header. The control plane protocol packets have a 64-bit header. All the internal words used as part of the IRIS virtual machine are 64 bits in size.

These headers are used by the interface hardware to assist in the communication between different nodes in the IRIS system. The control plane packet protocol is designed such that the IRIS system can scale to accommodate clustering as well as distributed processing.

Structure and Format of the control Plane packet

The type of packet field determines what type of packet this is and the specific command this packet is issuing or generated in response to. The list of system commands is shown below. At power up, all node Ids within the system and between systems are initialized. These are then stored in the system memory space and are visible to the system controller. In header the Source ID will be 64 bits and the Destination ID will be 16 bits.

The purpose of the flow ID in the header of the data plane packet is to keep track of the entire body of the packet that is split up into 64 bit switch words for entry into the IRIS switch fabric. The flow ID given to these 64 bit sections of the body of the packet is different from the flow ID of the traffic that is traversing through the network. The largest switch width per SNI that a set of 8 bit headers can handle is 256 64-bit port blocks or a switch that is 2048 bytes wide. At this size the switch through put with the switch clock at 100 MHz is going to be 1.6 Tbps in and 1.6 Tbps out on a packet-by packet basis. The extended packet bits indicate that this can be extended if the switch is made wider than 2048 bytes and can scale upwards to a maximum of 8192 bytes wide.

When a single body of the packet is broken into 64 bit sections, all the 64 bit sections associated with the same packet will have a headers as shown above in FIG. 27 that are the same the only header change will be between different packets. This allows the system control or the switch controller to keep track of the association of the switch words with the packet. The flows that are identified in the data plane of the switch are associated with the same packet, the flows that are identified in the control plane are associated with the traffic between a source and a sink node in the network.

Inputs

Inputs to the SNI-SFI ASIC come from the input queues associated with each physical port on the SNI that the ASIC belongs to. The structure of the input queues is shown in the section for the input queues and the output queues. The input queues store data in the native packet format that the data comes in through the serial link. These queues set a frame bit to store a header and do not set a frame bit to store the corresponding body of the packet. The start of a new packet is indicated by the occurrence of a set frame bit after the occurrence of an unset frame bit.

The communication between the Input-queue that is associated with the software portion of the prototype and the split header and data queues that form the interface registers portion of the SNI-SFI ASIC is done using file I/O. The file structure is as follows:

```
*        Indicates word boundaries
**       Indicates end of File
* Input queue word + Frame bit * -- Line 1
* Input queue word + Frame bit * -- Line 2
* Input queue word + Frame bit
* Input queue word + Frame bit * -- Line n**
```

This is an exact dump of the input queue that is shown in FIG. 25 in section 4.3.1.2. This is used by the file I/O piece of the front end that is part of the VHDL code associated with the SNI-SFI ASIC.

The entries from this file that maps the input queue on each are read and put into the header queue as well as the data queue that form the interface registers section of the SNI-SFI ASIC.

The other inputs to the ASIC come in on the connectors J2 and C2 that form the data paths for the data-plane and the control plane respectively. The control plane data-path uses the control plane packets to convey messages as shown in FIG. 29. The list of messages is shown below for the entire system. The messages that are passed down the data plane input connector J2 have the format shown in FIG. 25. These are processed by the controller module in the ASIC and dealt with accordingly.

Output

The output from the SNI-SFI ASIC comes in the form of the packets that are used in the data plane and the control plane. The control plane information is sent and received in the form of control plane packets on port/connector C1. The data plane packets are sent out on port/connector J I. The format of these packets is shown in FIG. 27. The input-output functionality is managed by the controller that is within the SNI-SFI ASIC, and runs the state machine to control the operation of the entire SNI in conjunction with the system controller.

4.3.2 System Controller (L2): The System Controller controls the Iris Platform. This includes coordinating data inputs from Standard Network Interface (SNI) cards, sending control messages to poll certain ports, facilitating communication between Switch Controller card and enabling the data transfer between Switch Fabric and SNI cards.

The System Controller Initialization happens as soon as the power is turned on. Further it initiates all the SNI cards, the SCRPC (Switch Controller and Router Processor) card, the Switch Fabric, and finally all the operational constants used by the switch.

The inputs to the system controller during the initialization process are summarized further in this section. At power up the system controller allocates node Ids to the nodes, starting with each individual SNI on the system itself, or in case of clusters to the SNI of each system individually. The node addresses are 16 bit addresses, of which the bits are used as follows:

10 LSB are used for Node ID and the 6 MSB are used to address entities within the node.

Thus the node ID in the system scoreboard will contain the super node ID such as the SNI, Route Processor, Scheduler, Switch Controller or System Controller as well as the Ids of entities within the node.

The super node Ids are as follows:

| System Controller: | x0007 |
| Switch Controller: | x0008 |
| Route Processor: | x0009 |
| Scheduler: | x000A |
| SNI Ids: | x000B–x03FF |

The total number of SNI possible within the system is then 1012. Each SNI can then have the sub nodes (Ports and other entities) that are indicated by the MSB, that is 6 bits (64 Sub nodes). The sub node ID 00x7 is reserved for the SNI-SFI ASIC on each SNI in the system.

Thus for example port 10 on SNI 1 can have the following address: x280B I.e.

| 001010 | = | 10 for the 6 MSB = 00xA |
| 0000001011 | = | 00x0B for the 10 LSB |

The system controller maintains two scoreboards for the proper operation of the entire IRIS system. These two scoreboards are:

(1) System Scoreboard
(2) Routing Scoreboard

System Scoreboard The structure of the system scoreboard is shown in the Table below. The system scoreboard helps the thread manager that is part of the system controller spawn and kill threads associated with each individual function/operation. The system scoreboard resides in the RTOS memory. This memory is either in the processor cache on the SCC or in the SCC system memory. It is preferred that this scoreboard reside on the processor cache if possible. Else the entries associated with each SNI reside on the processor cache and the rest of the entries which have lower criticality during operations will reside on the SCC memory which is likely to be SRAM. The thread manager traps and acts on messages or issues commands based on the message type received from any entity in the system

| Reserved (20 | Node ID (16) | State (12) | Command (12) | Status (4) |
|---|---|---|---|---|
| SNI 1 | | | | |
| SNI 2 | | | | |
| . | | | | |
| . | | | | |
| . | | | | |
| SNI N | | | | |
| RP | | | | |
| SC | | | | |
| Scheduler | | | | |

The System Scoreboard

The read write permissions are as shown in the figure below for all entries in the scoreboard for each of the super nodes. Only the super nodes can read and write to their designated areas in the scoreboard. No sub-node on any of the super nodes under any circumstances can read and write to any of the entries on the scoreboard.

| System Scoreboard | System Controller | Switch Controller | Route Processor | Scheduler | SNI |
|---|---|---|---|---|---|
| Reserved | R/W | R | R | R | R |
| Node ID | R/W | R | R | R | R |
| State | R/W | R/W (own entry) | R/W (own entry) | R/W (own entry) | R/W (own entry) |
| Command | R/W | R | R | R | R |
| Status | R/W | R | R | R | R |

The data is written to and read from the system scoreboard using the IRIS packet protocol. If simple updates need to happen during operation then is done through messages. If the nodes to which messages are sent are distributed physically (not in a single chassis) then the control plane packet protocol has to be used. The number in brackets indicates the size in bits of each field in the system scoreboard. The system controller has read write permissions for all the fields in the scoreboard. Each node will have read write permissions to specific fields in it's own entry (row) of the table.

Even though actual names of the nodes have been used the node ID that are generated at power up will be filled into this table. The table's maximum size is given by the limitation on the number of unique nodes that are possible within the system. Thus the maximum size of table: Max Size of System Scoreboard=$64 \times 2^{16}$ bits This is the amount of memory that needs to be allocated in the RTOS for the table to be stored. This table will be stored on the cache of the processor that is running the thread manager. This area of the cache cannot be overwritten under any circumstances. In the simulation this table will be represented by a memory either for the RTOS kernel that is given by the max size or in system memory on the platform on which the simulations are done.

Routing Scoreboard. Another table that the system controller stores or maintains is the routing scoreboard. The structure of the routing scoreboard is shown in the Table below. The entries in the routing scoreboard are created according to the data flow in the machine as shown in the functional architecture document. The size of the routing scoreboard is that based on the number of ports (input) on the switching platform. For any given configuration the size of routing scoreboard is going to be 3×Total number of Input ports on the switch/routing platform. The structure of the routing scoreboard is shown in the table below. There are 6 fields in the routing scoreboard. The size of each field is determined by several factors. The fields are briefly described below:

1) Protocol Type—Based on the type of protocol that the SNI from which this header entry originates the protocol type is tagged. This is dine in conjunction with the input port field. By default during initialization the user inputs or the system controller polls each SNI super node to determine what kind of protocol as well as how many nodes of particular speed are on each SNI node.

2) Source Address—This is the Source address that is obtained from the header of the protocol that is terminated by the SNI. If IP packets flow to the higher layers in the control plane then this indicates the IP source address from the header. If ATM cells are flowing to the control plane then this indicates ATM header source address. Similarly this field is of a size that can accommodate the most of the protocols including layer 3 and above. The size of this field is 10 bytes=80 bits.

3) Destination Address—Just like the source address field the information in this field in the routing scoreboard is that obtained from the header of the packet that is flowed up to the routing score board. The size of this field is also 10 bytes=80 bits.

4) Input Port—The size of this field is 16 bits as defined in the node ID section of this document. The 10 LSB indicate the super node that this sub node belongs to the six bits indicate it's ID. Thus once all the SNI Ids have been assigned. For each SNI 64 unique addresses are possible for each port on the SNI.

5) Output Port—The size of this field is 16 bits as defined in the node ID section of this document. The 10 LSB indicate the super node that this sub node belongs to the six bits indicate it's ID. Thus once all the SNI Ids have been assigned. For each SNI 64 unique addresses are possible for each port on the SNI.

6) Status—The status field is just 4 bits, any entry in the routing score board can have 15 possible statuses. These range from x0–xF.

The status codes are as follows on the routing scoreboard. The corresponding semaphores are also shown

| | NODE (re__nodestat) | Types | Status |
|---|---|---|---|
| 51 | Entry ready | Entry__ready | x1 |
| 52 | Entry being routed | Entry__route | x2 |
| 53 | Entry routed | Entry__route__done | x3 |
| 54 | Entry being scheduled | Entry__sched | x4 |
| 55 | Entry Schedule Done | Entry__sched__done | x5 |

-continued

| | NODE (re__nodestat) | Types | Status |
|---|---|---|---|
| 56 | Entry being switched | Entry__switch | x6 |
| 57 | Entry switched | Entry__switch__done | x7 |
| 58 | Un used | Un used | x8 |
| 59 | Un used | Un used | x9 |
| 60 | Un used | Un used | xA |
| 61 | Un used | Un used | xB |
| 62 | Un used | Un used | xC |
| 63 | Un used | Un used | xD |
| 64 | Un used | Un used | xE |
| 67 | Un used | Un used | xF |

The structure of the routing scoreboard is as shown below:

| Protocol Type (8) | Source Address (80) | Destination Address (80) | Input Port (16) | Output Port (16) | Status (4) |
|---|---|---|---|---|---|

The Routing Scoreboard

The routing scoreboard has a maximum number of possible entries that is equal to 3× the total number of ports on the switch. Since the switch can have 1012 SNI cards with 63 ports on each SNI, the total number of entries in the routing scoreboard is 63×1012=63756. The maximum size of the routing scoreboard when it's created in the RTOS/system memory is:

Routing Scoreboard Size=63,756×204 bits=13,006,224 bits

The system controller has read write permissions to all the fields in the scoreboard. The nodes have read write permission as shown below:

| Routing Scoreboard | System Controller | Route Processor | Scheduler | Switch Controller | SNI |
|---|---|---|---|---|---|
| Protocol Type | R/W | R | R | R | R/W |
| Source Address | R/W | R | R | R | R/W |
| Destination Address | R/W | R | R | R | R/W |
| Input Port | R/W | R | R | R | R/W |
| Output Port | R/W | R/W | R | R | R |
| Status | R/W | R/W | R/W | R/W | R |

The routing score board resides on the SCC memory. This memory will be made up of 0 wait state SRAMs or other fast memory.

Figure 31:
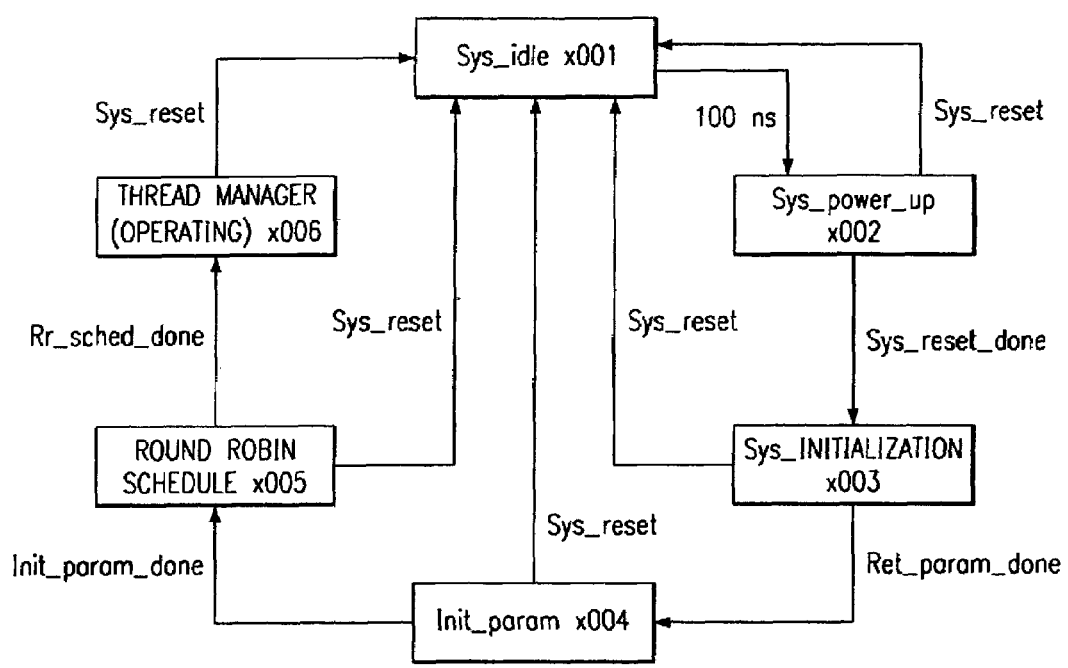
FIG. 31 is a state diagram illustrating the system initialization routine.

System Controller FSM. The system controller runs through what is called a system controller finite state machine (FSM) that is shown in FIG. 31. The FSM states are indicated by the state (10 bit) value as any other node. This state is updated in the system scoreboard by the system controller during operation as well as the initial stages. The system controller will generate a set of messages based on the state in which it is operating in. There are essentially 6 states that the system controller goes through. These are defined as:

1) sys_idle
2) Power up
3) System_initialize
4) System_parameters
5) Roundrobin_schedule
6) Thread_manager (Operational)

The State of each node can be indicated with 12 bits, thus the codes assigned to each state have a range from x000 to XFFF.

The messages/commands and instructions that are generated by the all entities in the system at power up are summarized below:

Power Up/Initialization

| # | Command/Message Name | Semaphore | Code | State |
|---|---|---|---|---|
| 1 | Request Parameters | Req_param | x0004 | Initialization |
| 2 | Return Parameters | Ret_param | x0008 | Initialization |
| 3 | System Reset | Sys_reset | X0009 | Any |
| 4 | Node Reset | Node_reset | x0010 | Any |
| 5 | System Status | Sys_stat | x0014 | Any |
| 6 | Node Status | Node_stat | x0018 | Any |

System controller can issue any of the commands but the super nodes other than the system controller are restricted to the following commands:
1) Route Processor
Ret_param, Node_reset, Node_stat
2) Scheduler
Ret_param, Node_reset, Node_stat
3) Switch Controller
Ret_param, Node_reset, Node_stat
4) SNI
Ret_param, Node_reset, Node_stat The FSM of the System controller and the transition points are shown in FIG. 31. Right after power up the system controller goes into the IDLE state for 10 cycles. Since the system clock is 10 ns, the IDLE state lasts for 100 ns. Then automatically it goes into the power up state after 100 ns. A set of commands/instructions are issued in each state. Each of these then maps to a specific packet type. At the higher layers the software/firmware controller takes the bits in the instruction field and converts them to the appropriate semaphore and acts on the commands. The FSM of the system controller is shown below.

The states that the system controller cycles through are associated with the commands that the system controller issues and the parameters that it tracks. Once it goes into the state called thread manager then the system is in an operational mode and the control has been distributed to each node FSM that run independent of each other once the thread associated with them is spawned.

The node then cycles through its own internal state and generates messages for the system controller as well as other nodes as part of its operation. These states and the messages generated in the due course of operation are available on the system scoreboard for monitoring as well as checks.

Sys_idle (x001)

After the power is turned on to the entire system, the system controller as well as the rest of the nodes in system stay in the IDLE state for 100 ns for the links and the signals to stabilize. The corresponding Idle state at the system controller level is the sys_idle (00x01) state. After 100 ns the system controller goes into a state called sys_power_up (00x02).

Sys_power_up (x002)

The system controller transitions to this state after being in the sys_idle state after 100 ns. The entire system is expected to run at a 10 ns clock. That means after the power is turned on the system controller is in the sys_idle state for 10 system clock cycles each of which are 1 0 ns. In this state the system controller issues the following commands (In order)
1) System Reset sys_reset
2) System Status sys_stat In response to the sys_reset command a node reset to every super node in the system is generated. This flow is indicated in the following figures:

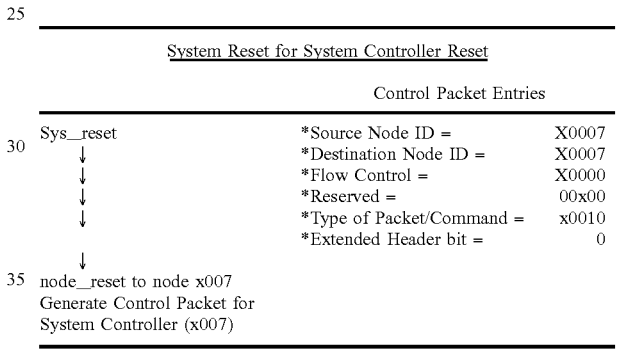

System Reset for System Controller

Since the type of packet field in the header of the control plane packet is structured as shown in the figure below, when looked at in Hex the command is encoded as shown in figure above. For the 12 bits of the instructions field the code is x004 as far as when the command is mapped for the entire type of packet field it's x0010 as shown in the figure above.

The fields intended to indicate the alarm are not set in a normal command/instruction/message. The reserved bits are not set unless the command needs to be cancelled. If the command is queued in the output queue in any node then the controller checks the queue whether the command issued needs to be issued in due course of operation, but the node might decide to cancel the command, if that is the case then the last two bits are set to 01 for cancel and at transmit time this packet is discarded.

After the sys_reset command is issued to the system controller the system controller scoreboard has the entries as shown below:

| Reserved (22) | Node ID (16) | State (12) | Command (12) | Status (4) |
|---|---|---|---|---|
| 00x00000 | SN 1 x000B | Idle (x001) | x000 | x1 |
| 00x00000 | SN 2 x000C | Idle (x001) | x000 | x1 |
| . | . | . | . | . |
| . | . | . | . | . |
| . | . | . | . | . |

-continued

| Reserved (22) | Node ID (16) | State (12) | Command (12) | Status (4) |
|---|---|---|---|---|
| 00x00000 | SN N x03FF | Idle (x001) | x000 | x1 |
| 00x00000 | Route x0009 Processor | Idle (x001) | x000 | x1 |
| 00x00000 | Switch x0008 Controller | Idle (x001) | x000 | x1 |
| 00x00000 | Scheduler x000A | Idle (x001) | x000 | x1 |
| 00x00000 | System x0007 Controller | Sys_power_up (x002) | Node_reset (x004) | x2 |

After the node reset has been executed by the system controller the system scoreboard has the following entries

| Reserved (22) | Node ID (16) | State (12) | Command (12) | Status (4) |
|---|---|---|---|---|
| 00x00000 | SN 1 x000B | Idle (x001) | x000 | x1 |
| 00x00000 | SN 2 x000C | Idle (x001) | x000 | x1 |
| . | . | . | . | . |
| . | . | . | . | . |
| . | . | . | . | . |
| 00x00000 | SN N x03FF | Idle (x001) | x000 | x1 |
| 00x00000 | Route x0009 Processor | Idle (x001) | x000 | x1 |
| 00x00000 | Switch x0008 Controller | Idle (x001) | x000 | x1 |
| 00x00000 | Scheduler x000A | Idle (x001) | x000 | x1 |
| 00x00000 | System x0007 Controller | Sys_power_up (x002) | Node_reset (x004) | X5 |

As part of the node_reset to the system controller when it executes the node_reset it initializes the routing scoreboard, 35 for which it has read write control to all fields. The routing scoreboard is as shown below when it is polled after the node_reset of the system controller is done:

| Protocol Type (8) | Source Address (80) | Destination Address (80) | Input Port (16) | Output Port (16) | Status (4) |
|---|---|---|---|---|---|
| x00 | x00000000000000000000 | x00 . . . 00 | x0000 | x0000 | x0 |
| x00 | x00000000000000000000 | x00 . . . 00 | x0000 | x0000 | x0 |
| x00 | x00000000000000000000 | x00 . . . 00 | x0000 | x0000 | x0 |
| x00 | x00000000000000000000 | x00 . . . 00 | x0000 | x0000 | x0 |
| x00 | x00000000000000000000 | x00 . . . 00 | x0000 | x0000 | x0 |
| x00 | x00000000000000000000 | x00 . . . 00 | x0000 | x0000 | x0 |
| x00 | x00000000000000000000 | x00 . . . 00 | x0000 | x0000 | x0 |
| . | . | . | . | . | . |
| . | . | . | . | . | . |
| x00 | x00000000000000000000 | x00 . . . 00 | x0000 | x0000 | x0 |

In the next stage the sys_reset command is translated to all the nodes in the system. Thus the system scoreboard should have the following entries at that time:

| Reserved (22) | Node ID (16) | State (12) | Command (12) | Status (4) |
|---|---|---|---|---|
| 00x00000 | SN 1 x000B | Idle (x001) | Node_reset (x004) | x2 |

-continued

| Reserved (22) | Node ID (16) | State (12) | Command (12) | Status (4) |
|---|---|---|---|---|
| 00x00000 | SN 2 x000C | Idle (x001) | Node_reset (x004) | x2 |
| . | . | . | . | . |
| . | . | . | . | . |
| . | . | . | . | . |
| 00x00000 | SN N x03FF | Idle (x001) | x000 | x2 |
| 00x00000 | Route x0009 Processor | Idle (x001) | Node_reset (x004) | x2 |
| 00x00000 | Switch x0008 Controller | Idle (x001) | Node_reset (x004) | x2 |
| 00x00000 | Scheduler x000A | Idle (x001) | Node_reset (x004) | x2 |
| 00x00000 | System x0007 Controller | Sys_power_up (x002) | Node_reset (x004) | X5 |

Once each node receives the respective node reset command from the system controller it goes into a node_reset state. This state is updated by the node in the respective entry/in the row corresponding to the node. Thus the system scoreboard has the entries shown in the next figure after a node_reset has been issued to every node.

| Reserved (22) | Node ID (16) | State (12) | Command (12) | Status (4) |
|---|---|---|---|---|
| 00x00000 | SN 1 x000B | Node_reset (x002) | Node_reset (x004) | X2 |
| 00x00000 | SN 2 x000C | Node_reset (x002) | Node_reset (x004) | x2 |
| . | . | . | . | . |
| . | . | . | . | . |
| . | . | . | . | . |
| 00x00000 | SN N x03FF | Node_reset (x002) | Node_reset (x004) | x2 |
| 00x00000 | Route x0009 Processor | Node_reset (x002) | Node_reset (x004) | x2 |
| 00x00000 | Switch x0008 Controller | Node_reset (x002) | Node_reset (x004) | x2 |
| 00x00000 | Scheduler x000A | Node_reset (x002) | Node_reset (x004) | x2 |
| 00x00000 | System x0007 Controller | Sys_power_up (x002) | Node_reset (x004) | x5 |

Once the reset command has been executed by every node they return to the idle state. Each node effectively updates this in its own corresponding state entry. In response the system controller updates all the corresponding status entries.

| Reserved (22) | Node ID (16) | State (12) | Command (12) | Status (4) |
|---|---|---|---|---|
| 00x00000 | SN 1 x000B | Idle (x001) | Node_reset (x004) | x5 |
| 00x00000 | SN 2 x000C | Idle (x001) | Node_reset (x004) | x5 |
| . | . | . | . | . |
| . | . | . | . | . |
| . | . | . | . | . |
| 00x00000 | SN N x03FF | Idle (x001) | Node_reset (x004) | x5 |
| 00x00000 | Route x0009 Processor | Idle (x001) | Node_reset (x004) | x5 |
| 00x00000 | Switch x0008 Controller | Idle (x001) | Node_reset (x004) | x5 |

-continued

| Reserved (22) | Node ID (16) | State (12) | Command (12) | Status (4) |
|---|---|---|---|---|
| 00x00000 | Scheduler x000A | Idle (x001) | Node_reset (x004) | x5 |
| 00x00000 | System Controller x0007 | Sys_power_up (x002) | Node_reset (x004) | x5 |

System Reset for System Controller Reset

Control Packet Entries

Sys_reset  
↓  *Source Node ID =           x0007  
↓  *Destination Node ID =      X0009  
↓  *Flow Control =             X0000  
↓  *Reserved =                 00x00  
↓  *Type of Packet/Command =   X0010  
   *Extended Header bit =      0  
↓  
node_reset to node x009  
Generate Control Packet for  
Route Processor (x0009)

Route Processor Reset

System Reset for System Controller Reset

Control Packet Entries

Sys_reset  
↓  *Source Node ID =           X0007  
↓  *Destination Node ID =      X0009  
↓  *Flow Control =             X0000  
↓  *Reserved =                 00x00  
↓  *Type of Packet/Command =   X0010  
   *Extended Header bit =      0  
↓  
node_reset to node x009  
Generate Control Packet for  
Switch Controller (x0008)

Switch Controller Reset

For each node the reset process involves the receipt of the control packet with the command field set to the appropriate node_reset code. The packet interface on each node takes the appropriate actions to make sure that the command or the data contained with the body of the packet.

System Reset for System Controller Reset

Control Packet Entries

Sys_reset  
↓  *Source Node ID =           X0007  
↓  *Destination Node ID =      X0009  
↓  *Flow Control =             X0000  
↓  *Reserved =                 00x00  
↓  *Type of Packet/Command =   X0010  
   *Extended Header bit =      0  
↓  
node_reset to node x009  
Generate Control Packet for  
Scheduler (x000A)

Scheduler Reset

System Reset for System Controller Reset

Control Packet Entries

Sys_reset  
↓  *Source Node ID =           X0007  
↓  *Destination Node ID =      X0009  
↓  *Flow Control =             X0000  
↓  *Reserved =                 00x00  
↓  *Type of Packet/Command =   X0010  
   *Extended Header bit =      0  
↓  
node_reset to node x009  
Generate Control Packet for  
SNI (x000B)

SNI Reset

The system controller then issues a sys_stat command. In response to which every node returns the status again (For double check) the scoreboard changes are reflected in the figures that follow:

| Reserved (22) | Node ID (16) | State (12) | Command (12) | Status (4) |
|---|---|---|---|---|
| 00x00000 | SN 1 x000B | Idle (x001) | Node_reset (x004) | x2 |
| 00x00000 | SN 2 x000C | Idle (x001) | Node_reset (x004) | x2 |
| . | . | . | . | . |

-continued

| Reserved (22) | Node ID (16) | State (12) | Command (12) | Status (4) |
|---|---|---|---|---|
| . | . | . | . | . |
| 00x00000 | SN N x03FF | Idle (x001) | Node_reset (x004) | x2 |
| 00x00000 | Route x0009 Processor | Idle (x001) | Node_reset (x004) | x2 |
| 00x00000 | Switch x0008 Controller | Idle (x001) | Node_reset (x004) | x2 |
| 00x00000 | Scheduler x000A | Idle (x001) | Node_reset (x004) | x2 |
| 00x00000 | System x0007 Controller (x002) | Sys_power_up (x004) | Node_reset | x2 |

On the next go around when the system controller polls every node the ret nodestat is received back from each node with the node status in it then the scoreboard is updated to reflect the appropriate message.

| Reserved (22) | Node ID (16) | State (12) | Command (12) | Status (4) |
|---|---|---|---|---|
| 00x00000 | SN 1 x000B | Idle (x001) | x000 | x5 |
| 00x00000 | SN 2 x000C | Idle (x001) | x000 | x5 |
| . | . | . | . | . |
| 00x00000 | SN N x03FF | Idle (x001) |  | x5 |
| 00x00000 | Route x0009 Processor | Idle (x001) | x000 | x5 |
| 00x00000 | Switch x0008 Controller | Idle (x001) | x000 | x5 |
| 00x00000 | Scheduler x000A | Idle (x001) | x000 | x5 |
| 00x00000 | System x0007 Controller | Sys_power_up (x002) | x000 | x5 |

This generates an internal system controller message sys_reset_done. This allows the system controller to transition to the next state that is called sys_initialization.

Sys_Initialization (x003)

The system controller runs the initialization process that follows the FSM as shown in FIG. 31. The system scoreboard contains the entries as shown below at the start of this state.

| Reserved (22) | Node ID (16) | State (12) | Command (12) | Status (4) |
|---|---|---|---|---|
| 00x00000 | SN 1 x000B | Idle (x001) | x000 | x1 |
| 00x00000 | SN 2 x000C | Idle (x001) | x000 | x1 |
| . | . | . | . | . |
| 00x00000 | SN N x03FF | Idle (x001) |  | x1 |
| 00x00000 | Route x0009 Processor | Idle (x001) | x000 | x1 |
| 00x00000 | Switch x0008 Controller | Idle (x001) | x000 | x1 |
| 00x00000 | Scheduler x000A | Idle (x001) | x000 | x1 |
| 00x00000 | System x0007 Controller | Sys_Initialization (X003) | x000 | x1 |

The initialization process involves the following steps after the power is turned on:
1) Initialize Switch Fabric Card (SFC)
2) Initialize Standard Network Interface Cards (SNI)
3) Initialize Switch Controller Route Processor Card (SCRPC)
4) Initialize All Operational Constants The initialization sequence for each module involves the request of parameters and return of parameters. The initialization of all the system constants takes place in this step as well. The system constants are calculated from both the user inputs that are given to the system as well as from the parameters read from

4.3.3 Switch Controller (I.3)

The objective of the Switch Controller is to manage the Scheduler and Route Processor functionality and co-ordinate with System Controller for reading from and writing to SNI cards and Switch Fabric.

4.3.3.1 Scheduler (I.3.1)

The Iris Switch Scheduler is a custom scheduler that uses a sequencing graph consisting of read, write operations that need to be scheduled. Each node of this graph has a set of properties.

The objectives for the Switch Scheduler are:
a. Make sure the switch is fully utilized
b. Operations are scheduled based on their priority (label)
c. Inputs:

Unscheduled Sequencing Graph: This Graph holds all the operations that are unscheduled at the beginning of a duty cycle.

Outputs

Scheduled Sequencing Graph: All the operations that are fed to the scheduler are analyzed and prioritized based on predetermined constraints and few operations are selected that can be scheduled.

Interrupts Generated:

Interrupts Handled:

Status:

Configurable Parameters:

Priority: Should the labels be customizable. Since IP packet structure may have different set of priority scheme vs. ATM cells, should Iris have a custom priority labeling that is protocol independent.

# of Unscheduled Ops:

# of Candidate Ops:

# of Selected Ops:

Node Structure: The default Node structure has: Status, Operation Type, Op Id, predecessor Op Id, successor Op Id. (??? Should this structure be changeable???).

4.3.3.2 Route Processor (I.3.2)

Due to the large Route Table lookup and increasing speed in routers in the Internet Route lookup efficiently has emerged as an important factor in Router efficiency. Iris routing

6. Appendix A: IRIS System Commands Semaphores and Codes

| Number | Name | Semaphore | Code (12) | TOP field value (code-16) |
|---|---|---|---|---|
| | POWER | UP | | COMMANDS |
| 1 | Request Parameters | req_param | X001 | X0004 |
| 2 | Return Parameters | ret_param | X002 | X0008 |
| 3 | System Reset | sys-reset | X003 | X0009 |
| 4 | Node Reset | node_reset | x004 | X000C |
| 5 | System Status | sys-stat | x005 | x0014 |
| 6 | Node Status | node_stat | x006 | x0018 |
| 7 | Return Node Status | ret_nodestat | x007 | x001C |
| 8 | Return System Status | ret_sysstat | x008 | x0020 |
| | OPERATIONAL | | | COMMANDS |
| 7 | Request Graph | Req_graph | x009 | x0024 |
| 8 | Return Graph | Ret_graph | x00A | x0028 |
| 9 | Start Schedule | Start_sched | x00B | x002c |
| 10 | Start Route | Start_route | x00C | x0030 |
| 11 | Request Schedule RR | Req_sched_rr | x00D | x0034 |
| 12 | Request Schedule Reg | Req_sched | x00E | x0038 |
| 13 | Return Schedule | Ret_sched | x00F | x003C |
| 14 | Request Route | Req_route | x01F | x007C |
| 15 | Return Route | Ret_route | x02F | x00BC |
| 16 | Node Status | Node_stat | x03F | x00FC |
| 17 | Port Empty | Port-empty | x04F | x013C |
| 18 | Return Port Status | Ret_port_stat | x05F | x017C |
| 19 | Request port status | Ret_port_stat | x06F | x01BC |
| 20 | Read port | Read_port | x07F | x01FC |
| 21 | Write_port | Write_port | x08F | x023C |
| 22 | Read_portblock | Read_portb | x09F | x027C |
| 23 | Write_portblock | Write-portb | x0AF | x02BC |
| 24 | Reset portblock | Reset_portb | x0BF | x02FC |
| 25 | Reset DIPS | Reset_dips | x0CF | x033C |

-continued

6. Appendix A: IRIS System Commands Semaphores and Codes

| Number | Name | Semaphore | Code (12) | TOP field value (code-16) |
|---|---|---|---|---|
| 26 | Return Fabric Map | Ret_Fabmap | x0DF | x037C |
| 27 | Request Fabric Map | Req_fabmap | x0EF | x03BC |
| 28 | Reset Fabric Map | Reset-fabmap | x0FF | x03FC |
| 29 | Generate Fabric Map | Gen_fabmap | x01FF | x07FC |
| 30 | Node Status | node_stat | x2FF | x0BFC |
| 31 | Return Node Status | Ret_nodestat | x3FF | x0FFC |
| 32 | Return System Status | Ret_sysstat | x4FF | x013FC |
| | ALARMS (Value = | Severity) | | |
| 33 | Power up failure (1) | Pwrup_fail | x010 | x4040 |
| 34 | Node failure (1) | Node_fail | x020 | x4080 |
| 35 | Control Link Failure (1) | Cntrl_lnkfail | x030 | x40C0 |
| 36 | Data Link Failure (1) | Data_lnkfail | x040 | x4100 |
| 37 | Device Failure (1) | Dev_fail | x050 | x4140 |
| 38 | Global Memory Failure (1) | Globmem_fail | x060 | x4180 |
| 39 | Local Memory Failure (1) | Locomem_fail | x070 | x41C0 |
| 40 | Global Mem read Fail (1) | Globmem_rfail | x080 | x4200 |
| 41 | Global Mem write Fail (1) | Globmem_wfail | x090 | x4280 |
| 42 | Local mem read fail (2) | Locmem_rfail | x0A0 | x8280 |
| 43 | Local mem write fail (2) | Locmem_wfail | x0B0 | x82C0 |
| 44 | System clock fail (1) | Syscik_fail | x0C0 | x43C0 |
| 45 | Read port failure (1) | Readport_fail | x0D0 | x4340 |
| 46 | Write port failure (1) | Writeport_fail | x0E0 | x4380 |
| 47 | Read Portblock Fail (2) | Readpb-fail | x0F0 | x83C0 |
| 48 | Write Portblock Fail (2) | Writepb_fail | x100 | x8400 |
| 49 | Fabricmap generate fail (1) | Fabmapgen_fail | x200 | x4800 |
| 50 | Fabricmap return fail (1) | Fabmapret_fail | x300 | x4C00 |

Status Messages for System Scoreboard

| | NODE (ret_nodestat) | Types) | Status |
|---|---|---|---|
| 51 | Node idle | Node_idle | x1 |
| 52 | Node is executing command | Node_exec | x2 |
| 53 | Node read error | Node_rfail | x3 |
| 54 | Node write error | Node_wfail | x4 |
| 55 | Node had executed command | Node_execudone | x5 |
| 56 | Un used | Un Used | x6 |
| 57 | Un used | Un used | x7 |
| 58 | Un used | Un used | x8 |
| 59 | Un used | Un used | x9 |
| 60 | Un used | Un used | xA |
| 61 | Un used | Un used | xB |
| 62 | Un used | Un used | xC |
| 63 | Un used | Un used | xD |
| 64 | Un used | Un used | xE |
| 67 | Un used | Un used | xF |

Status Messages for Routing Scorboard

| | NODE (re_nodestat) | Types) | Status |
|---|---|---|---|
| 51 | Entry ready | Entry_ready | x1 |
| 52 | Entry being routed | Entry_route | x2 |
| 53 | Entry routed | Entry_route_done | x3 |
| 54 | Entry being scheduled | Entry_sched | x4 |
| 55 | Entry Schedule Done | Entry_sched_done | x5 |
| 56 | Entry being switched | Entry_switch | x6 |
| 57 | Entry switched | Entry_switch_done | x7 |
| 58 | Un used | Un used | x8 |
| 59 | Un used | Un used | x9 |
| 60 | Un used | Un used | xA |
| 61 | Un used | Un used | xB |
| 62 | Un used | Un used | xC |
| 63 | Un used | Un used | xD |
| 64 | Un used | Un used | xE |
| 67 | Un used | Un used | xF |

Operational
 1. Alarm (3 levels with highest having most priority)
 2. Port Empty
 3. Return Port Status
 4. Request Port Status
 5. Read Port
 6. Write Port
 7. Read Port Block
 8. Write Port Block
 9. Reset Port Block
 10. Reset DIPS
 11. Fabric Map (2D-Rectangular, 3D-Cuboid, User Defined)
 12. Request map
 13. Reset Map
 14. Return Map Alarms
1. Power Up Failure
2. Node Failure
3. Device Failure
4. Datalink Failure
5. Control Link Failure
6. Global Memory Failure
7. Local Memory Access Failure
8. Clock Failure (local)
9. System Clock Failure
10. Read Port Failure
11. Write Port Failure
12. Read Port Block Failure
13. Write Port Block Failure
14. Map Return Failure
15. Map Failure (Filling of lookup table in Switch Fabric Controller)

APPENDIX B: REPORTS & OUTPUTS

The following reports need to be generated from the prototype so that the operational throughputs of Iris switch/router can be quantified and the claims verified. All reports should be formatted so that they can easily be downloaded into a spreadsheet program, so charts can be generated for visual display of the results.

Logic Analyzer Report:
Scheduler Timing Report:
   This report will show along the time scale, the graph status, # Ops Unscheduled, # Candidate Ops, # Ops selected, QoS parameters for various nodes read, etc.
   This report will show along the time scale, the snapshot of the routing table. The routing table itself contains the Input Port ID, the Output Port ID, the Input IP address (if IP packet), the Output IP address (if IP packet), Status, the Index in the portblock array (row, column).

Switch Fabric Traffic Report:
   This report shows along the time scale, the traffic input and output patterns. By comparing with previous snapshots the traffic flow through the switch fabric can be analyzed.

Data Input Patterns Report at various Ports with time:
   This report shows along the time scale, the input through all ports. This will help analyze the traffic input pattern, the timing at various parts of the Standard Network Interface (SNI) card needs to be studied to analyze the Framer/DeFramer, SNI Buffer delays, etc.

Data Output Pattern Report at various Ports with time:
   This report shows along the time scale, the output through all ports. This will help analyze the traffic output pattern.

Although the present invention and its advantages have been described in detail, it should be understood that various changes, substitutions and alterations can be made herein without departing from the spirit and scope of the invention as defined by the appended claims.

What is claimed is:

1. An intelligent routing and switching system comprising:
   an interface for coupling said system to an external network;
   a switch fabric for selectively routing bits of data being exchanged with the external network through said interface and comprising an array of multiport switching elements each including switches and memory elements for introducing programmable delays in selected ones of the bits being routed;
   a first controller for implementing a routing table and scheduler in accordance with a sequencing graph to route bits of data through said switch fabric; and
   a second controller for generating the sequencing graph and for allocating input and output slots for inputting and outputting data through said interface.

* * * * *